United States Patent
Ryoshi et al.

(10) Patent No.: US 10,593,942 B2
(45) Date of Patent: Mar. 17, 2020

(54) NICKEL-CONTAINING COMPOSITE HYDROXIDE AND PRODUCTION PROCESS THEREFOR, POSITIVE-ELECTRODE ACTIVE MATERIAL FOR A NONAQUEOUS-ELECTROLYTE SECONDARY BATTERY AND PRODUCTION PROCESS THEREFOR, AND NONAQUEOUS-ELECTROLYTE SECONDARY BATTERY

(71) Applicant: SUMITOMO METAL MINING CO., LTD., Tokyo (JP)

(72) Inventors: Kazuomi Ryoshi, Ehime (JP); Kensaku Mori, Ehime (JP); Katsuya Kase, Ehime (JP); Yasutaka Kamata, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 43 days.

(21) Appl. No.: 15/522,852

(22) PCT Filed: Oct. 29, 2015

(86) PCT No.: PCT/JP2015/080625
§ 371 (c)(1),
(2) Date: Apr. 28, 2017

(87) PCT Pub. No.: WO2016/068263
PCT Pub. Date: May 6, 2016

(65) Prior Publication Data
US 2017/0324090 A1 Nov. 9, 2017

(30) Foreign Application Priority Data
Oct. 30, 2014 (JP) .................. 2014-222004

(51) Int. Cl.
*H01M 4/525* (2010.01)
*C01G 53/00* (2006.01)
(Continued)

(52) U.S. Cl.
CPC .......... *H01M 4/525* (2013.01); *C01G 53/006* (2013.01); *C01G 53/42* (2013.01); *C01G 53/50* (2013.01);
(Continued)

(58) Field of Classification Search
CPC ...................................... H01M 4/525
See application file for complete search history.

(56) References Cited

U.S. PATENT DOCUMENTS

2007/0248883 A1* 10/2007 Oda ............... H01M 4/525
429/231.1
2014/0106228 A1 4/2014 Toya et al.
(Continued)

FOREIGN PATENT DOCUMENTS

| JP | H08-045509 A | 2/1996 |
| JP | H08-213015 A | 8/1996 |

(Continued)

OTHER PUBLICATIONS

International Search Report dated Jan. 12, 2016, from the corresponding PCT/JP2015/080625.

*Primary Examiner* — Edward J. Schmiedel
(74) *Attorney, Agent, or Firm* — Katten Muchin Rosenman LLP

(57) ABSTRACT

Provided is a nickel-containing composite hydroxide that is a precursor of a positive-electrode active material with which a nonaqueous-electrolyte secondary battery having a low irreversible capacity and a high energy density can be configured. An aqueous alkaline aqueous solution and a complexing agent are added to an mixed aqueous solution
(Continued)

including at least nickel and cobalt to regulate the pH (measured at a reference liquid temperature of 25° C.) of this mixed aqueous solution to 11.0 to 13.0, the ammonium concentration to 4 to 15 g/L, and the reaction temperature to 20° C. to 45° C. Using stirring blades having an inclination angle of 20° to 60° with respect to a horizontal plane, the mixture is stirred to conduct a crystallization reaction under such conditions that when the nickel-containing composite hydroxide to be obtained is roasted in air at 800° C. for 2 hours, the roasted composite hydroxide has a BET value of 12 to 50 m$^2$/g. Thus a nickel-containing composite hydroxide expressed by $Ni_{1-x-y}Co_xAl_yM_t(OH)_{2+\alpha}$ (where, $0<x\leq0.20$, $0<y\leq0.15$, $0\leq t\leq0.10$, $0\leq\alpha$ 0.50, and M is one or more kind of element selected from among Mg, Ca, Ba, Nb, Mo, V, Ti, Zr and Y), or the general formula: $Ni_{1-x-z}Co_xMn_zM_t(OH)_{2+\alpha}$ (where $0<x\leq0.50$, $0<z\leq0.50$, $x+z\leq0.70$, $0\leq t\leq0.10$, $0\leq\alpha\leq0.50$, and M is one or more kind of element selected from among Mg, Ca, Ba, Nb, Mo, V, Ti, Zr and Y) is obtained.

6 Claims, 3 Drawing Sheets

(51) Int. Cl.
*H01M 10/0525* (2010.01)
*H01M 4/02* (2006.01)

(52) U.S. Cl.
CPC ........ *C01G 53/66* (2013.01); *H01M 10/0525* (2013.01); *C01P 2004/03* (2013.01); *C01P 2004/32* (2013.01); *C01P 2004/53* (2013.01); *C01P 2004/61* (2013.01); *C01P 2004/62* (2013.01); *C01P 2004/64* (2013.01); *C01P 2006/11* (2013.01); *C01P 2006/12* (2013.01); *C01P 2006/40* (2013.01); *H01M 2004/021* (2013.01); *H01M 2004/028* (2013.01); *Y02T 10/7011* (2013.01)

(56) References Cited

U.S. PATENT DOCUMENTS

2014/0377660 A1    12/2014   Fukui et al.
2016/0013472 A1*   1/2016    Mitsumoto ........... H01M 4/505
                                                 429/231.1

FOREIGN PATENT DOCUMENTS

| JP | 2000-030693 A | 1/2000 | |
|----|---------------|--------|---|
| JP | 3614670 B2 | 1/2005 | |
| JP | 2011-201764 A | 10/2011 | |
| JP | 2012252844 A | 12/2012 | |
| JP | 2013147416 A | 8/2013 | |
| JP | 2013-246983 A | 12/2013 | |
| WO | WO-2014136760 A1 * | 9/2014 | ............ H01M 4/505 |

* cited by examiner

NICKEL-CONTAINING COMPOSITE HYDROXIDE AND PRODUCTION PROCESS THEREFOR, POSITIVE-ELECTRODE ACTIVE MATERIAL FOR A NONAQUEOUS-ELECTROLYTE SECONDARY BATTERY AND PRODUCTION PROCESS THEREFOR, AND NONAQUEOUS-ELECTROLYTE SECONDARY BATTERY

TECHNICAL FIELD

The present invention relates to a nickel-containing composite hydroxide and production method therefor, a positive-electrode active material for a nonaqueous-electrolyte secondary battery that uses the nickel-containing composite hydroxide as the raw material and production process therefor, and a nonaqueous-electrolyte secondary battery that uses this positive-electrode active material for a nonaqueous-electrolyte secondary battery as a positive electrode material

BACKGROUND ART

In recent years, as portable electronic devices such as portable telephones, notebook type personal computers and the like have become widespread, there is a need for developing a compact and lightweight secondary battery that has a high energy density. Moreover, there is also a need for development of a high-output secondary battery as the battery for electric automobiles such as hybrid automobiles. As a nonaqueous-electrolyte secondary battery that satisfies such needs, there is a lithium-ion secondary battery. A lithium-ion secondary battery includes a negative electrode, a positive electrode, an electrolyte and the like, and a material from which lithium ions can be desorbed and to which lithium ions can be inserted is used as the active material for the negative electrode and positive electrode.

A lithium-ion secondary battery that uses a lithium transition metal composite oxide, and particularly a lithium cobalt composite oxide that is comparatively easy to form as the positive-electrode material, is able to obtain a 4V high voltage, so is expected to be a battery having high-energy density, and practical use of such a battery is progressing. For a battery that uses a lithium cobalt composite oxide, much development is being performed in order to obtain excellent initial capacity characteristics and cycling characteristics, and various results have already been obtained.

However, lithium cobalt composite oxide uses expensive cobalt compounds for the raw material, so the unit cost per capacity of a battery that uses this kind of lithium cobalt composite oxide becomes much higher than that of a nickel hydride battery, and thus the applicable uses are limited. Therefore, lowering the cost of the positive-electrode material and making possible the production of a less expensive lithium ion secondary battery for not only a compact secondary battery for portable electronic devices, but also for a large secondary battery for electric-power storage for electric automobiles is highly anticipated, and realization of such would have large industrial significance.

As an example of new material for the active material for a lithium-ion secondary battery, there is lithium cobalt oxide that uses nickel that is less expensive than cobalt. This lithium nickel composite oxide shows a lower electrochemical potential than lithium cobalt composite oxide, so it is difficult for decomposition due to oxidation of the electrolyte to become a problem, and high capacity can be expected, and because a high battery voltage similar to that of a lithium cobalt composite oxide is possible, much development is being performed. However, a lithium-ion secondary battery that uses a lithium nickel composite oxide that is formed with purely nickel only has disadvantages in that the cycling characteristics are inferior when compared with a lithium cobalt composite oxide, and the loss of battery performance due to usage and storage in high-temperature environments occurs comparatively easily.

In order to solve such disadvantages, a lithium nickel-containing composite oxide in which part of the nickel has been replaced with other added elements has been proposed. For example, for the purpose of improving discharge characteristics and cycling characteristics of a lithium-ion secondary battery, JPH08-213015 (A) proposes a lithium nickel-containing composite oxide that is expressed by the general formula: $Li_xNi_aCo_bM_cO_2$ (where $0.8 \le x \le 1.2$, $0.01 \le a \le 0.99$, $0.01 \le b \le 0.99$, $0.01 \le c \le 0.3$, $0.8 \le a+b+c \le 1.2$, and M is at least one kind of element selected from among Al, V, Mn, Fe, Cu and Zn). Moreover, for the purpose of improving capacity characteristics and cycling characteristics of a lithium-ion secondary battery that can be used or stored in a high-temperature environment, JPH08-045509 (A) proposes a lithium nickel-containing composite oxide that is expressed by the general formula: $Li_wNi_xCo_yB_zO_2$ (where $0.05 \le w \le 1.10$, $0.5 \le x \le 0.995$, $0.005 \le z \le 0.20$, $x+y+z=1$).

According to the technology described in the above literature, it is possible to obtain a lithium nickel-containing composite oxide having higher charge/discharge capacity and more excellent cycling characteristics than a lithium cobalt composite oxide. However, with the technology described in literature above, the lithium nickel-containing composite oxide described above is obtained by mixing and firing of the metal salt raw material, so the irreversible capacity that is defined by the difference between the initial charge capacity and the initial discharge capacity is large, and when forming a battery, an extra amount of negative-electrode material must be used that is equal to an amount that corresponds to the irreversible capacity of the positive-electrode material. As a result, not only does the unit mass and the battery capacity per unit volume of the overall battery decrease, but there is also a problem in the terms of safety since there is an increase in the lithium amount used for the negative-electrode material.

In regard to this, JP 3,614, 670 (B2) describes technology of obtaining a lithium nickel-containing composite oxide having a layered hexagonal crystal structure by first obtaining nickel-containing composite hydroxide by adding alkali to a mixed aqueous solution of metal salt as raw material and performing co-precipitation, then mixing this with a lithium compound and firing; the lithium nickel-containing composite oxide being expressed by the general formula: $[Li]_{3a}[Ni_{1-x-y}Co_xAl_y]_{3b}[O_2]_{6c}$ (where subscripts of [ ] express sites, and the conditions $0 < x \le 0.20$ and $0 < y \le 0.15$ are satisfied). This lithium nickel-containing composite oxide is such that the site occupancy of metal ions other than lithium at site 3a that is obtained from Rietveld analysis of X-ray diffraction (hereafter, this is referred to as the "non-lithium occupancy") is 1.7% or less, and includes secondary particles that are formed by an aggregation of plural primary particles having an average particles size of no less than 0.1 μm and no greater than 1 μm, and the crystal particle size that is calculated from the X-ray diffraction 003 peak is 73 nm or greater.

In a secondary battery that uses this lithium nickel-containing composite oxide as a positive-electrode active material, an initial discharge capacity of 160 mAh/g or greater, an irreversible capacity of 46 mAh/g or less and a Coulomb efficiency of 78% or greater are achieved. In other words, when this lithium nickel-containing composite oxide is used as positive-electrode active material, it is possible to sufficiently maintain the contact surface area with the electrolyte, and improve the diffusion rate of Li ions in the liquid phase, and it is possible to maintain the Li diffusion path in the solid phase, so it becomes possible to simultaneously improve the initial discharge capacity and the irreversible capacity.

On the other hand, in order to be able to further increase the energy density of a lithium-ion secondary battery, it is necessary to improve the filling ability of the positive-electrode active material. In order for that, increasing the particle size of the secondary particles of the lithium nickel-containing oxide that forms the positive-electrode active material is effective. However, lithium nickel-containing composite oxide has a low firing temperature of about 850° C., so it is difficult to increase the size of secondary particles by growing the primary particles by firing lithium nickel-containing composite oxide at a high temperature as in the case of lithium cobalt composite oxide. Therefore, in order to improve the filling ability of lithium nickel-containing composite oxide, it is necessary to increase the particle size of secondary particles in the precursor stage. However, the average particle size of nickel-containing composite hydroxide that is obtained by the co-precipitation described in JP 3,614,670 (B2) is at a maximum about 12 μm, and in this method, producing nickel-containing composite hydroxide that includes secondary particles having a large particle size is difficult.

In regard to this, JP2011-201764 (A) describes technology for obtaining a nickel-containing composite hydroxide having an average particle size of 15 μm to 50 μm by making the ratio of the supply of mixed aqueous solution that includes metal salt as raw material with respect to the amount of reaction solution at the supply port to 0.04% by volume/min or less while stirring the reaction solution using stirring blades having an angle of 45° or less with respect to a horizontal plane when coprecipitating the nickel-containing composite hydroxide.

With this technology, it is considered possible to improve the filling ability of the positive-electrode active material by increasing the particle size of the nickel-containing composite hydroxide, and to increase the energy density of the secondary battery that is obtained. However, in a positive-electrode active material that is obtained by taking the nickel-containing composite hydroxide described in JP2011-201764 (A) as a precursor, when the average particle size of the secondary particles becomes 20 μm or greater, it becomes difficult to suppress an increase in the non-lithium occupancy, and thus it is not possible to obtain a secondary battery having high energy density and sufficiently small irreversible capacity.

RELATED LITERATURE

Patent Literature

[Patent Literature 1] JPH08-213015 (A)
[Patent Literature 2] JPH08-045509 (A)
[Patent Literature 3] JP 3,614,670 (B2)
[Patent Literature 4] JP2011-201764 (A)

SUMMARY OF INVENTION

Problem to be Solved by Invention

Taking the problems described above into consideration, an object of the present invention is to provide a nonaqueous-electrolyte secondary battery having a small irreversible capacity and high energy density, a positive-electrode active material as positive-electrode material for a nonaqueous-electrolyte secondary battery having these characteristics, and a nickel-containing composite hydroxide as a precursor to the positive-electrode active material.

Means for Solving Problems

The inventors of the present invention, as a result of repeated diligent research of the problems described above, learned that when the average particle size of lithium nickel-containing composite oxide is 20 μm or greater, the cause of increasing irreversible capacity of a secondary battery is in the decrease in reactivity that is caused by a reduction in the contact surface area between nickel-containing composite hydroxide and a lithium compound in the chemical synthesis process. Based on this knowledge and as a result of further repeated research, it was learned that by controlling the BET value of the nickel-containing composite hydroxide during that chemical synthesis process to be a fixed value or greater, it is possible to maintain the reactivity between the nickel-containing composite hydroxide and the lithium compound, and as a result, a nonaqueous-electrolyte secondary battery having a high energy density and small irreversible capacity can be obtained. The present invention was achieved based on this knowledge.

In other words, the nickel-containing composite hydroxide of the present invention is expressed by the general formula: $Ni_{1-x-y}Co_xAl_yM_t(OH)_{2+\alpha}$ (where, $0<x\leq0.20$, $0<y\leq0.15$, $0\leq t\leq0.10$, $0\leq\alpha\ 0.50$, and M is one or more kind of element selected from among Mg, Ca, Ba, Nb, Mo, V, Ti, Zr and Y), or the general formula: $Ni_{1-x-z}Co_xMn_zM_t(OH)_{2+\alpha}$ (where $0<x\leq0.50$, $0<z\leq0.50$, $x+z\leq0.70$, $0\leq t\leq0.10$, $0\leq\alpha\leq0.50$, and M is one or more kind of element selected from among Mg, Ca, Ba, Nb, Mo, V, Ti, Zr and Y), and includes secondary particles that are formed from an aggregation of plural primary particles, with the average particle size of the secondary particles being 20 μm to 50 μm, and the average particle size of the primary particles being 0.01 μm to 0.40 μm, and when roasted in air for 2 hours at 800° C., the BET value of the nickel-containing composite oxide that is obtained is 12 $m^2/g$ to 50 $m^2/g$.

Preferably, the shape of the secondary particles is spherical or ellipsoidal.

The production method for a nickel-containing composite hydroxide of the present invention is a method for producing a nickel-containing composite hydroxide that is expressed by the general formula: $Ni_{1-x-y}Co_xAl_yM_t(OH)_{2+\alpha}$ (where, $0<x\leq0.20$, $0<y\leq0.15$, $0\leq t\leq0.10$, $0\leq\alpha\ 0.50$, and M is one or more kind of element selected from among Mg, Ca, Ba, Nb, Mo, V, Ti, Zr and Y), or the general formula: $Ni_{1-x-z}Co_xMn_zM_t(OH)_{2+\alpha}$ (where $0<x\leq0.50$, $0<z\leq0.50$, $x+z\leq0.70$, $0\leq t\leq0.10$, $0\leq\alpha\leq0.50$, and M is one or more kind of element selected from among Mg, Ca, Ba, Nb, Mo, V, Ti, Zr and Y) by a crystallization reaction; and when performing the crystallization reaction,
adds an alkaline aqueous solution to a mixed aqueous solution that includes at least nickel and cobalt to make the pH value of that mixed aqueous solution that is measured at a reference liquid temperature of 25° C. 11.0 to 13.0;

makes the reaction temperature of the mixed aqueous solution 20° C. to 45° C.;

adds a complexing agent to the mixed aqueous solution to make the ammonium ion concentration of that mixed aqueous solution 4 g/L to 15 g/L; and using stirring blades that have an inclination angle with respect to a horizontal plane of no less than 20° and no greater than 60°, stirs the mixed solution according to stirring conditions so that the BET value of nickel-containing composite oxide that is obtained by roasting the nickel-containing composite hydroxide in air for 2 hours at 800° C. becomes 12 m$^2$/g to 50 m$^2$/g.

The production method for nickel-containing composite hydroxide may also further include a process of covering the nickel-containing composite hydroxide that is obtained by the crystallization reaction with Al or Mn, or with Al or Mn and added elements M.

Moreover, the positive-electrode active material for a nonaqueous-electrolyte secondary battery of the present invention is a positive-electrode active material for a nonaqueous-electrolyte secondary battery that includes a lithium nickel-containing composite oxide that is expressed by the general formula: $Li_{1+u}Ni_{1-x-y}Co_xAl_yM_tO_2$ (where $0<x\leq0.20$, $0<y\leq0.15$, $0\leq t\leq0.10$, $0\leq u\leq0.50$, and M is at least one kind of element selected from among Mg, Ca, Ba, Nb, Mo, V, Ti, Zr and Y), or $Li_{1+u}Ni_{1-x-z}Co_xMn_zM_tO_2$ (where $0<x\leq0.50$, $0<z\leq0.50$, $x+z\leq0.70$, $0\leq t\leq0.10$, $0\leq u\leq0.50$, and M is at least one kind of element selected from among Mg, Ca, Ba, Nb, Mo, V, Ti, Zr and Y), and includes secondary particles that are formed by an aggregation of plural primary particles, and has a layered hexagonal crystal structure; and the average particle size of the secondary particles is 20 μm to 50 μm, the average particle size of the primary particles is 0.10 μm to 0.40 μm, and the site occupancy of metal ions other than lithium ions at site 3a that is obtained from Rietveld analysis of X-ray diffraction is 1.5% or less.

Preferably, the shape of the secondary particles is spherical or ellipsoidal. Furthermore, preferably, the tap density of the secondary particles is 2.5 g/cm$^3$ or greater.

The production method for a positive-electrode active material for a nonaqueous-electrolyte secondary battery of the present invention is a production method for a positive-electrode active material that includes a lithium nickel-containing composite oxide that has a layered hexagonal crystal structure that is expressed by the general formula: $Li_{1+u}Ni_{1-x-y}Co_xAl_yM_tO_2$ (where $0<x\leq0.20$, $0<y\leq0.15$, $0\leq t\leq0.10$, $0\leq u\leq0.50$, and M is at least one kind of element selected from among Mg, Ca, Ba, Nb, Mo, V, Ti, Zr and Y), or $Li_{1+u}Ni_{1-x-z}Co_xMn_zM_tO_2$ (where $0<x\leq0.50$, $0<z\leq0.50$, $x+z\leq0.70$, $0\leq t\leq0.10$, $0\leq u\leq0.50$, and M is at least one kind of element selected from among Mg, Ca, Ba, Nb, Mo, V, Ti, Zr and Y);

the method includes;

a mixing process for forming a lithium mixture by mixing the nickel-containing composite hydroxide or heat treated particles of that nickel-containing composite hydroxide with a lithium compound; and a firing process of performing firing of the lithium mixture that was formed in the mixing process in an oxygen atmosphere at a temperature of 650° C. to 850° C.

Preferably, the production method for a positive-electrode active material for a nonaqueous-electrolyte secondary battery further includes a roasting process before the mixing process for obtaining the heat treated particles by roasting the nickel-containing composite hydroxide in an air atmosphere at 400° C. to 900° C.

The nonaqueous-electrolyte secondary battery of the present invention uses the positive-electrode active material for a nonaqueous-electrolyte secondary battery as positive-electrode material.

Effect of Invention

With the present invention, it is possible to obtain a nickel-containing composite hydroxide that has high reactivity with a lithium compound even when the average particle size is 20 μm or greater. Moreover, when forming a positive-electrode active material using this nickel-containing composite hydroxide as a precursor, it is possible to suppress non-lithium occupancy rate at site 3a of the positive-electrode active material and improve the filling ability of that positive-electrode active material. As a result, with a secondary battery that uses the positive-electrode active material of the present invention, it becomes possible to simultaneously achieve both a reduction in the irreversible capacity and an increase in high-energy density, thus the industrial significance of the present invention is very large.

MODES FOR CARRYING OUT INVENTION

Figure 1:
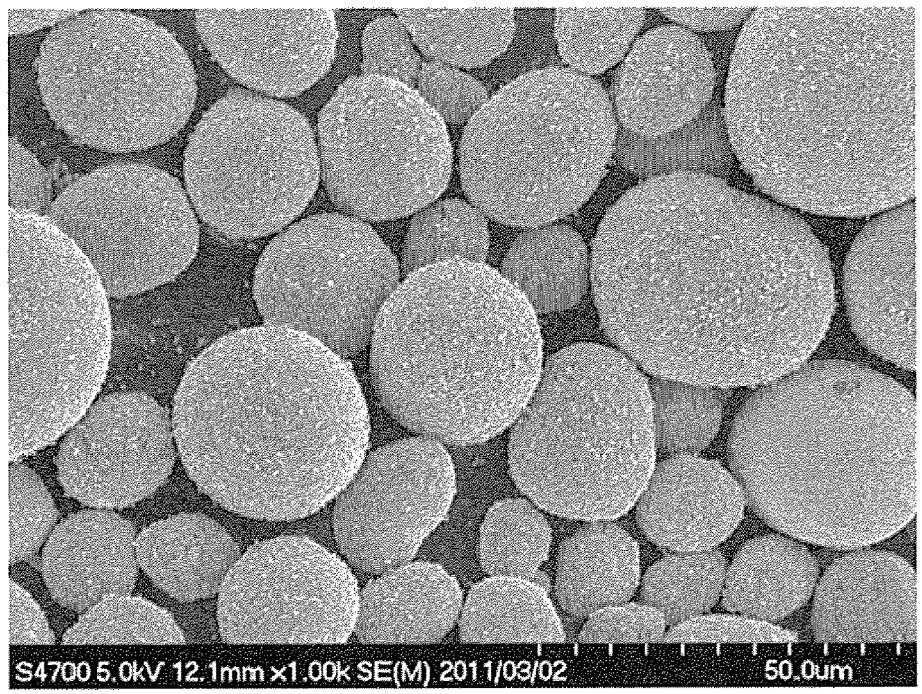
FIG. 1 is a SEM photograph of a nickel-containing composite hydroxide that is obtained according to an Example 1.
Figure 2:
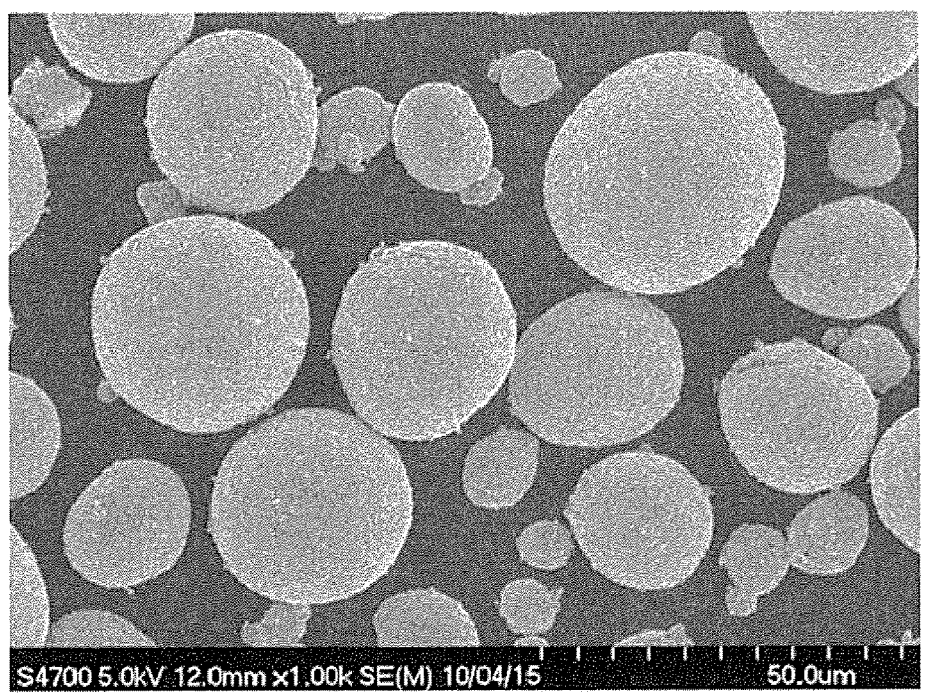
FIG. 2 is a SEM photograph of a nickel-containing composite hydroxide that is obtained according to a Comparative Example 1.

The present invention relates to (1) a nickel-containing composite hydroxide as a raw material for a positive-electrode active material for a nonaqueous-electrolyte secondary battery (hereafter, referred to as "positive-electrode active material") and a production method therefor; (2) a positive-electrode active material that uses the nickel-containing composite hydroxide and a production method therefor; and (3) a nonaqueous-electrolyte secondary battery that uses the positive-electrode active material. In the following, (1) to (3) will each be explained in detail.

(1-1) Nickel-containing Composite Hydroxide

The nickel-containing composite hydroxide of the present invention is expressed by the general formula: $Ni_{1-x-y}Co_xAl_yM_t(OH)_{2+\alpha}$ (where, $0<x\leq0.20$, $0<y\leq0.15$, $0\leq t\leq0.10$, $0\leq\alpha\leq0.50$, and M is one or more kind of element selected from among Mg, Ca, Ba, Nb, Mo, V, Ti, Zr and Y), or the general formula: $Ni_{1-x-z}Co_xMn_zM_t(OH)_{2+\alpha}$ (where $0<x\leq0.50$, $0<z\leq0.50$, $x+z\leq0.70$, $0\leq t\leq0.10$, $0\leq\alpha\leq0.50$, and M is one or more kind of element selected from among Mg, Ca, Ba, Nb, Mo, V, Ti, Zr and Y), and includes secondary particles that are formed from an aggregation of plural primary particles, with the average particle size of the secondary particles being 20 μm to 50 μm, and the average particle size of the primary particles being 0.01 μm to 0.40 μm. Moreover, when roasted in air for 2 hours at 800° C., the BET value of the nickel-containing composite oxide that is obtained is 12 m$^2$/g to 50 m$^2$/g.

a) Composition

The composition of the nickel-containing composite hydroxide of the present invention is expressed by the general formula: $Ni_{1-x-y}Co_xAl_yM_t(OH)_{2+\alpha}$ (where, $0<x\leq0.20$, $0<y\leq0.15$, $0\leq t\leq0.10$, $0\leq\alpha\ 0.50$, and M is one or more kind of element selected from among Mg, Ca, Ba, Nb, Mo, V, Ti, Zr and Y), or the general formula: $Ni_{1-x-z}Co_xMn_zM_t(OH)_{2+\alpha}$ (where $0<x\leq0.50$, $0<z\leq0.50$, $x+z\leq0.70$, $0\leq t\leq0.10$, $0\leq\alpha\leq0.50$, and M is one or more kind of element selected from among Mg, Ca, Ba, Nb, Mo, V, Ti, Zr and Y).

This composition ratio (Ni:Co:Al or Mn:M) is also maintained even in the positive-electrode active material that is obtained. Therefore, the composition ratio of the nickel-containing composite hydroxide of the present invention is adjusted to become the same as the composition ratio that is required for the positive-electrode active material that is to be obtained. The composition ratio of the nickel-containing composite hydroxide can be identified by ICP emission spectroscopy.

b) Particle Structure and Average Particle Size

The nickel-containing composite hydroxide of the present invention includes secondary particles that are formed by an aggregation of plural primary particles. The average particle size of these secondary particles must be 20 μm to 50 μm, and preferably 25 μm to 40 μm, and more preferably 25 μm to 35 μm. When the average particle size of the secondary particles is within this kind of range, the average particle size of the positive-electrode active material that is obtained using this nickel-containing composite hydroxide as a precursor can be controlled to be within the range 20 μm to 50 μm, so the filling ability of the positive-electrode active material is improved, and thus the energy density of a nonaqueous-electrolyte secondary battery can be improved. The average particle size of secondary particles can be found by using a laser diffraction type particle size distribution meter.

Moreover, the shape of the secondary particles is preferably a spherical or ellipsoidal. When the shape is this kind of shape, it is possible to make the shape of the positive-electrode active material that is obtained the same, and thus it is possible to further improve the filling ability of the positive-electrode active material. The shape of the secondary particles can be checked by observation using a scanning electron microscope (SEM).

On the other hand, the average particle size of the primary particles of the secondary particles must be 0.01 μm to 0.40 μm, and preferably 0.1 μm to 0.40 μm, and more preferably 0.1 μm to 0.25 μm. When the average particle size of the primary particles is within this kind of range, the average particle size of the primary particles of the positive-electrode active material that is obtained can be controlled to be within the range 0.10 μm to 0.40 μm, and as will be described later, it becomes possible to increase the contact surface area between the positive-electrode active material and the electrolyte. The average particle size of primary particles can be found by embedding secondary particles in resin or the like, and making it possible to observe the cross section of the secondary particles by performing cross section polishing, then measuring the particle size of ten or more primary particles and calculating the average value of those particles sizes.

c) BET Value

The nickel-containing composite hydroxide of the present invention is such that the BET value of nickel-containing composite oxide that is obtained by roasting the nickel-containing composite hydroxide in air for 2 hours at 800° C. is 12 m²/g to 50 m²/g, and preferably 12 m²/g to 30 m²/g, and more preferably 13 m²/g to 20 m²/g.

As described above, for a nonaqueous-electrolyte secondary battery that uses a lithium nickel-containing composite oxide as positive-electrode active material, in order to reduce the irreversible capacity, it is necessary to make the non-lithium occupancy rate at site 3a that is obtained from the result of an Rietveld analysis of X-ray diffraction a set value or less, however, in order to do that, it is important that the reactivity between the lithium compound and nickel-containing composite hydroxide be sufficiently maintained. Here, the reactivity between the lithium compound and nickel-containing composite hydroxide depends on the contact surface area thereof, or in other words, depends on the BET value of the nickel-containing composite hydroxide, and from the aspect of obtaining a high energy density, when the average particle size of the positive-electrode active material is 20 μm or greater, the average particle size of the nickel-containing composite hydroxide precursor must also be 20 μm or greater. However, in conventional nickel-containing composite hydroxide, when the average particle size becomes 20 μm or greater, the BET value after roasting in air for 2 hours at 800° C. becomes about 1 m²/g to 10 m²/g, and it becomes impossible to obtain sufficient reactivity with the lithium compound.

On the other hand, with the nickel-containing composite hydroxide of the present invention, the BET value after roasting in air for 2 hours at 800° C. can be made to be 12 m²/g to 50 m²/g, and preferably 12 m²/g to 30 m²/g, and more preferably 13 m²/g to 20 m²/g. Therefore, even when the average particle size of the nickel-containing composite hydroxide is 20 μm or greater, the reactivity with the lithium compound can be sufficiently maintained, and as a result, it becomes possible to maintain the non-lithium occupancy rate at site 3a of the obtained positive-electrode active material at 1.5% or less. When the BET value is less than 12 m²/g, it is not possible to avoid a decrease in reactivity due to a decrease in the contact surface area between the nickel-containing composite hydroxide and lithium compound, and the non-lithium occupancy rate at site 3a becomes high. However, when the BET value is greater than 50 m²/g, production cost increases when trying to obtain nickel-containing composite hydroxide in an industrial production process.

Here, the BET value means the surface area per unit mass (m²/g) of powder that is measured by the BET method, and can be measure by using a flow method gas adsorption specific surface area measurement device. The BET value is a parameter that regulates reactivity between the lithium compound and the nickel-containing composite hydroxide, however, generally, the BET value of a nickel-containing composite hydroxide is strongly affected by temperature and atmosphere during drying, so it cannot be taken to be a stable evaluation index. However, for the BET value of a nickel-containing composite hydroxide that is obtained by roasting the nickel-containing composite hydroxide in air at 400° C. to 900° C., it is possible to eliminate the effect of the temperature and atmosphere during drying. Therefore, in the present invention, instead of the BET value of the nickel-containing composite hydroxide itself, the BET value when this nickel-containing composite hydroxide is roasted in air for 2 hours at 800° C. is used as a parameter for evaluating the reactivity between the lithium compound and the nickel-containing composite hydroxide.

The condition for evaluating the BET value, or in other words, the condition of roasting in air for 2 hours at 800° C. is only a condition for evaluating the BET value of the nickel-containing composite hydroxide, and using this nickel-containing composite hydroxide is not related to conditions when making the positive-electrode active material.

(1-2) Production Method for Nickel-containing Composite Hydroxide

The production method for the nickel-containing composite hydroxide of the present invention is not particularly limited, and as long as it is possible to obtain a nickel-containing composite hydroxide that has the characteristics described above, various methods can be used. For example, it is possible to use a method in which under specified conditions, an aqueous solution that includes nickel (Ni) and cobalt (Co), an aqueous solution that includes Ni, Co and aluminum (Al) or manganese (Mn), and a further aqueous solution that includes added elements M (hereafter, referred to as the "mixed aqueous solution") are stirred, and while stirring, an alkaline aqueous solution is used in the presence of a complexing agent to neutralize and perform a crystallization reaction. In this case, by controlling the crystallization conditions and the stirring method as will be described below, a nickel-containing composite hydroxide having the characteristics described above can be easily obtained.

In the present invention, it is possible to use sulfates, nitrates, chlorides and like of Ni, Co, Al, Mn and the added elements M as metal salts of each.

Al, Mn and the added elements M can be crystallized together with Ni and Co in the crystallization reaction as described above, and uniformly dispersed in the nickel-containing composite hydroxide, however, after obtaining a nickel-containing composite hydroxide that does not include Al or Mn, or Al or Mn and the added elements M from the crystallization process, a separate coating process may be provided in which the surface of that nickel-containing composite hydroxide is coated with an Al or Mn compound, or an Al or Mn compound and a compound of the added elements. Alternatively, in a mixing process that will be described later, it is possible to mix these compounds, together with the nickel-containing composite hydroxide that does not include Al or Mn, or Al or Mn and the added elements M, with the lithium compound. Furthermore, these methods can be used together. However, whichever method is used, the amounts included must be adjusted so that the nickel-containing composite hydroxide that is obtained has the composition of the general formula described above.

a) Crystallization Conditions

In order to obtain a nickel-containing composite hydroxide having high reactivity with a lithium compound as described above, or in other words, in order to obtain a nickel-containing composite hydroxide having a BET value when the nickel-containing composite hydroxide is roasted in air for 2 hours at 800° C. that is within the range 12 $m^2/g$ to 50 $m^2/g$, it is necessary to maintain the pH value that is measured at a reference liquid temperature of 25° C. within a specified range, as well as to suitably control the reaction temperature and ammonium ion concentration and to perform the crystallization reaction in a state in which the solubility of nickel-containing composite hydroxide is low.

It is necessary to maintain the pH value within the range 11.0 to 13.0, and preferably 11.5 to 12.5. When the pH value is less than 11.0, the solubility of the nickel-containing composite hydroxide is caused to increase, and the average particle size of the primary particles becomes too large, so making the BET value after roasting 12 $m^2/g$ or greater becomes difficult.

Preferably controlling the pH value is performed by adding an alkaline aqueous solution to the mixed aqueous solution. As the alkaline aqueous solution, it is possible to use an aqueous solution such as ammonia, sodium hydroxide, potassium hydroxide and the like.

The reaction temperature must be controlled to be within the range 20° C. to 45° C., and preferably 30° C. to 40° C. As long as the reaction temperature is within this kind of range, a state in which the solubility of the nickel-containing composite hydroxide during the crystallization reaction is low can be maintained, so it becomes possible to increase the particle size of the secondary particles while suppressing growth of the primary particles. When the reaction temperature is less than 20° C., an increase in the temperature due to heat being generated from a neutralization reaction cannot be suppressed, stable temperature control becomes difficult, and the particle size of the secondary particles cannot be increased. However, when the reaction temperature is greater than 45° C., solubility of the nickel-containing composite hydroxide is caused to increase and the average particle size of the primary particles becomes too large, so making the BET value after roasting 12 $m^2/g$ or greater becomes difficult.

Moreover, it is necessary that the ammonium ion concentration be controlled to be within the range 4 g/L to 15 g/L, and preferably 4 g/L to 10 g/L, and more preferably 5 g/L to 7 g/L. By maintaining the ammonium concentration to be within this kind of range, it similarly becomes possible to increase the particle size of the secondary particles while suppressing growth of the primary particles. When the ammonium ion concentration is less than 4 g/L, the solubility of the nickel-containing composite hydroxide becomes too low, so even though it may be possible to control the average particle size of the primary particles to be within the range 0.01 μm to 0.4 μm, it becomes difficult to control the average particle size of the secondary particles to be within the range 20 μm to 40 μm. However, when the ammonium ion concentration is greater than 15 g/L, as in the case when the reaction temperature is greater than 45° C., it becomes difficult to make the BET value after roasting be 12 g/$m^2$ or greater.

Adjustment of the ammonium ion concentration can be performed by adding an ammonium ion donor such as ammonia, ammonium chloride, ammonium sulfate, ammonium nitrate or the like as a complexing agent.

b) Stirring Method

[Inclination Angle of the Stirring Blades]

In the crystallization reaction, in order to obtain secondary particles of nickel-containing composite hydroxide having an average particle size of 20 μm to 50 μm, it is necessary to use stirring blades that have an inclination angle with respect to a horizontal plane that is no less than 20° and no greater than 60°, and preferably no less than 30° and no greater than 45°. By using stirring blades that have this kind of inclination angle, it is possible to increase the diffusion speed in not only the horizontal direction, but also the vertical direction, so in the reaction solution, it is possible to effectively suppress the formation of areas of high metal salt concentration, and areas of high pH values. However, when the inclination angle of the stirring blades is less than 20°, sufficient stirring force cannot be obtained, and it becomes impossible to make the distribution of the metal salt concentration uniform. On the other hand, when the inclination angle of the stirring blades is greater than 60°, even though the stirring force itself becomes strong, the shear force that occurs due to stirring increases, and the speed of flow in the horizontal direction also increases. Therefore, even when the primary particles aggregate and form secondary particles, the shear force, or the collisions between the secondary particles and the inner wall of the reaction tank causes the secondary particles to break apart, and as a result, it becomes difficult to control the average particle size of the secondary particles to be within the range 20 μm to 50 μm.

[Stirring Blade Size, Number of Blades and Stirring Speed]

The stirring conditions such as the size (diameter) of the stirring blades, the number of blades, and the stirring speed (stirring rpm) greatly affect the shape of the particles, and particularly the average particle size of the primary particles, the average particle size of the secondary particles, the BET value and the sphericity of the particles. However, the optimum stirring conditions in order to obtain the target nickel-containing composite hydroxide, or more specifically, a nickel-containing composite hydroxide of which the average particle size of the secondary particles is 20 μm to 50 μm, the average particle size of primary particles is 0.01 μm to 0.4 μm, and the BET value after roasting in air for 2 hours at 800° C. is 12 m$^2$/g to 50 m$^2$/g must be appropriately selected according to the shape, size (volume), aspect ratio (ratio of the diameter and height of the reaction tank) and the like of the reaction tank, and cannot be unambiguously determined.

For example, when a cylindrical shaped reaction tank (volume 20 L to 120 L) having a bottom surface diameter of 300 mm to 500 mm, and height of 300 mm to 600 mm (aspect ratio (diameter/height)=0.5 to 1.67) is used, the size of the stirring blades is preferably 20% to 50%, and more preferably 30% to 40% the diameter of the reaction tank, the number of stirring blades is preferably 3 to 8 blades, and more preferable 3 to 6 blades, and the stirring speed is preferably 500 rpm to 1500 rpm, and more preferably 600 rpm to 1200 rpm.

Typically, when the crystallization conditions (reaction temperature, pH value, complexing agent concentration, reaction time and the like) are the same, there is a tendency for the optimum stirring speed in a large reaction tank to become less than in a small reaction tank.

Therefore, in the present invention, taking the above matters into consideration, it is necessary to perform preliminary testing and the like to appropriately determine the optimum stirring conditions for obtaining the target nickel-containing composite hydroxide. As a result, a nickel-containing composite hydroxide having the properties described above can be efficiently obtained.

(2-1) Positive-electrode Active Material for a Nonaqueous-electrolyte Secondary Battery The positive-electrode active material of the present invention includes a lithium nickel-containing composite oxide that is expressed by the general formula: $Li_{1+u}Ni_{1-x-y}Co_xAl_yM_tO_2$ (where 0<x≤0.20, 0<y≤0.15, 0≤t≤0.10, 0≤u≤0.5, and M is at least one kind of element selected from among Mg, Ca, Ba, Nb, Mo, V, Ti, Zr and Y), or $Li_{1+u}Ni_{1-x-z}Co_xMn_zM_tO_2$ (where 0<x≤0.50, 0<z≤0.50, x+z≤0.70, 0≤t≤0.10, 0≤u≤0.50, and M is at least one kind of element selected from among Mg, Ca, Ba, Nb, Mo, V, Ti, Zr and Y), and includes secondary particles that are formed by an aggregation of plural primary particles, and has a layered hexagonal crystal structure. Particularly, the positive-electrode active material of the present invention, is such that the average particle size of the secondary particles is 20 μm to 50 μm, the average particle size of the primary particles is 0.10 μm to 0.40 μm, and the site occupancy of metal ions other than lithium ions at site 3a that is obtained from Rietveld analysis of X-ray diffraction is 1.5% or less.

a) Composition

The value u indicates the excess amount of lithium (Li) and is no less than 0 and no greater than 0.50, and preferably is no less than 0 and no greater than 0.20, and more preferably is no less than 0 and no greater than 0.10. When the value of u is less than 0, the reaction resistance of the positive electrode in a nonaqueous-electrolyte secondary battery that uses the obtained positive-electrode active material becomes large, so the output of the secondary battery becomes low. However, when the value of u is greater than 0.50, the initial discharge capacity of a nonaqueous-electrolyte secondary battery that uses the obtained positive-electrode active material decreases, and the reaction resistance of the positive electrode also increases.

In the lithium nickel-containing composite oxide positive-electrode active material of the present invention, nickel (Ni) is an element that mainly creates the particle structure of the nickel-type lithium-ion positive-electrode active material. Therefore, the value of 1−x−y that indicates the Ni content is basically 0.30 or greater, and preferably 0.50 or greater, and more preferably 0.65 or greater. By Ni forming the main transition metal, the positive-electrode active material is formed so as to have a layered hexagonal crystal structure.

In the case of the general formula: $Li_{1+u}Ni_{1-x-y}Co_xAl_yM_tO_2$, cobalt (Co) is an added element that contributes to the improvement of the cycling characteristic. In this composition, the value of x that indicates the Co content is greater than 0 but no greater than 0.2, and preferably is greater than 0 but no greater than 0.15. When the Co content is within this kind of range, the positive-electrode active material has a good cycling characteristic, or in other words had good durability. When the value of x that indicates the Co content is greater than 0.20, there is a large decrease in the initial discharge capacity.

In this composition, aluminum (Al) is an added element that contributes to the improvement of thermal stability. The value of y that indicates the Al content is greater than 0 but no greater than 0.15, and preferably is greater than 0 but no greater than 0.10. When the value of y is greater than 0.15, a problem occurs in that there is a decrease in the charge/discharge capacity.

Moreover, similarly, in the general formula $Li_{1+u}Ni_{1-x-z}Co_xMn_zM_tO_2$ as well, Co is an element that contributes to the cycling characteristic. In this composition, the value of x that indicates the Co content is greater than 0 but no greater than 0.70, and preferably is greater than 0 but no greater than 0.50. When the value of x that indicates the Co content is greater than 0.70, there are few merits as a nickel-type lithium-ion positive-electrode active material in that a layered structure cannot be maintained, and there is a large decrease in the initial discharge capacity.

In this composition, manganese (Mn) is an added element that contributes to the improvement of thermal stability. The value z that indicates the Mn content is greater than 0 but no greater than 0.50, and preferably is greater than 0 but no greater than 0.35. By keeping the Mn content within this kind of range, thermal stability of the positive-electrode active material during charging is improved, and a secondary battery can be manufactured that is excellent in terms of safety. Moreover, Mn is an inexpensive element, so increasing the Mn content leads to a reduction in cost of the positive-electrode active material. When the value of x that indicates the Mn content is greater than 0.50, a layered structure is not maintained, there is a large decrease in the initial discharge capacity, and the cycling characteristic also becomes bad.

In this composition, the value of x+z that indicates the total content of Co and Mn is no less than 0.70 and preferably is no less than 0.50. When the value of x+z that indicates the content of Co and Mn is greater than 0.70, a layered structure is not maintained, there is a large decrease in the initial discharge capacity, and the cycling characteristic also becomes bad, so there are few merits as a nickel-type lithium-ion positive-electrode active material. In individual comparison, preferably the nickel content is greater than the cobalt content and the manganese content.

Furthermore, the object of the positive-electrode active material of the present invention is to improve the durability and the output characteristics of a secondary battery that is obtained, so it is also possible to include added elements M in the lithium nickel-containing composite oxide. As such added elements it is possible to use one or more kind of elements selected from among magnesium (Mg), calcium (Ca), barium (Ba), niobium (Nb), molybdenum (Mo), vanadium (V), titanium (Ti), zirconium (Zr) and yttrium (Y). These added elements M are appropriately selected according to the usage and desired performance of a secondary battery that uses the obtained positive-electrode active material.

The value of t that indicates the content of added elements M is greater than 0 but no greater than 0.1, and preferably greater than 0 but no greater than 0.05. When the value of t is greater than 0.10, the metal elements that contribute to the Redox reaction decrease, so the battery capacity decreases.

The composition of the positive-electrode active material can be identified by ICP emission spectroscopy.

b) Particle Structure and Average Particle Size

The positive-electrode active material of the present invention includes secondary particles that are formed by an aggregation of plural primary particles, and is such that as the particle size of secondary particles increases, the growth of primary particles is suppressed.

The average particle size of secondary particles is 20 µm to 50 µm, and preferably 25 µm to 40 µm, and more preferably 30 µm to 40 µm, and even more preferably 20 µm to 35 µm. By keeping the average particle size of the secondary particles within this kind of range, the filling ability of the positive-electrode active material is improved, and thus the energy density of a nonaqueous-electrolyte secondary battery can be improved. When the average particle size of secondary particles is less than 20 µm, the filling ability is low, and high energy density cannot be obtained. However, when the average particle size of secondary particles is greater than 50 µm, there is a possibility that trouble will occur in the production of a positive-electrode plate.

The shape of the secondary particles is preferably a spherical shape or ellipsoidal shape. With this kind of shape, the positive-electrode active material has a higher filling ability, so the energy density can be further improved.

The average particle size of the primary particles of the secondary particles must be 0.10 µm to 0.40 µm, and preferably 0.10 µm to 0.35 µm, and more preferably 0.15 µm to 0.35 µm, and even more preferably 0.20 µm to 0.35 µm. Lithium diffusion inside the positive-electrode active material can be broadly divided into diffusion in the solid phase and diffusion in the electrolyte, where diffusion in the electrolyte is considered to have a diffusion rate that is several magnitudes faster. Diffusion in the electrolyte is performed by electrolyte penetrating inside the secondary particles by way of spaces that exist between primary particles. In the present invention, by controlling the average particle size of the primary particles to be within the range above, the number and size of the spaces that exist between primary particles become proper, and for the overall positive-electrode active material, the diffusion rate of lithium is improved, and the irreversible capacity can be reduced.

However, when the average particle size of the primary particles is less than 0.10 µm, the spaces between particles become small and it becomes difficult for the electrolyte to penetrate to the inside, so it becomes difficult to sufficiently reduce the irreversible capacity. On the other hand, when the average particle size of the primary particles is greater than 0.40 µm, the distance from the center of a primary particle to the surface becomes long, so the diffusion rate of lithium ions into the primary particles becomes slow, and the irreversible capacity increases.

c) Non-lithium Occupancy

In the positive-electrode active material of the present invention, the non-lithium occupancy rate at site $3a$ that is obtained from Rietveld analysis of X-ray diffraction is controlled to be 1.5% or less, and preferably 1.3% or less, and more preferably 1.2% or less, and as a result, a diffusion path for lithium in the solid phase is maintained and irreversible capacity can be suppressed. Here, the non-lithium occupancy rate at site $3a$ can be found from the results of Rietveld analysis of powder X-ray diffraction.

Diffusion of lithium in the solid phase proceeds by lithium ions that are located at site $3a$ entering and leaving reversibly, however, when other metal ions are mixed in at site $3a$ and the non-lithium occupancy is greater than 1.5%, the diffusion path for lithium becomes obstructed, which brings about a decrease in the diffusion rate, and thus causes the charge/discharge characteristics of a secondary battery to become bad. Particularly, in a positive-electrode active material having an average particle size of 20 µm or greater, as reactivity between the nickel-containing composite hydroxide and the lithium compound decreases, it becomes difficult to sufficiently suppress the non-lithium occupancy rate at site $3a$.

However, in the present invention, as described above, by controlling the properties of the particles of the nickel-containing composite hydroxide precursor of the positive-electrode active material so that the BET value of the nickel-containing composite hydroxide after roasting in air for 2 hours at 800° C. is within a proper range, the reactivity between the nickel-containing composite hydroxide and the lithium compound increases, and as a result, even in the case of positive-electrode active material having an average particles size of 20 µm or greater, the non-lithium occupancy rate at site $3a$ can be suppressed to 1.5% or less.

d) Tap Density

The tap density of the positive-electrode active material of the present invention is preferably controlled to be 2.5 g/cm$^3$ or greater, and more preferably 2.5 g/cm$^3$ to 3.2 g/cm$^3$, and even more preferably 2.7 g/cm$^3$ to 3.1 g/cm$^3$. Here, the tap density is the bulk density of sample powder that has been collected in a container after tapping 100≤times according to the JIS Z-2504 standard, and can be measured by using a shaking type specific gravity measurement device.

When the tap density is less than 2.5 g/cm$^3$, the filling ability of the positive-electrode active material cannot be sufficiently improved, so it may not be possible to sufficiently improve the energy density of a nonaqueous-electrolyte secondary battery that uses the positive-electrode active material. The upper limit of the tap density is not particularly limited, however, the upper limit under normal production conditions is about 3.2 g/cm$^3$.

(2-2) Production Method for Positive-electrode Active Material for a Nonaqueous-electrolyte Secondary Battery The production method for positive-electrode active material for a nonaqueous-electrolyte secondary battery of the present invention is a production method for a positive-electrode active material that is expressed by the general formula: $Li_{1+u}Ni_{1-x-y}Co_xAl_yM_tO_2$ (where $0<x\leq0.20$, $0<y\leq0.15$, $0\leq t\leq0.10$, $0\leq u\leq0.50$, and M is at least one kind of element selected from among Mg, Ca, Ba, Nb, Mo, V, Ti, Zr and Y), or $Li_{1+u}Ni_{1-x-z}Co_xMn_zM_tO_2$ (where $0<x\leq0.50$, $0<z\leq0.50$, $x+z\leq0.70$, $0\leq t\leq0.10$, $0\leq u\leq0.50$, and M is at least one kind of element selected from among Mg, Ca, Ba, Nb, Mo, V, Ti, Zr and Y), and includes a lithium nickel-containing composite oxide that has a layered hexagonal crystal structure, and has a mixing process for forming a lithium mixture by mixing the nickel-containing composite hydroxide described above, or heat treated particles that are obtained by heat treating the nickel-containing composite hydroxide with a lithium compound, and a firing process for performing firing of the lithium mixture formed in the mixing process at a temperature of 650° C. to 850° C. in an oxygen atmosphere.

a) Mixing Process

Lithium compound is mixed with the nickel-containing composite hydroxide so that in the mixture of the nickel-containing composite hydroxide and the lithium compound, the ratio (Li/Me) of the number of Li atoms (Li) with respect to the total number of atoms of the metal elements of this nickel-containing composite hydroxide, or in other words, Ni, Co, Al or Mn, and the added elements M (Me) becomes 1.00 to 1.50, and preferably 1.00 to 1.20 and more preferably 1.00 to 1.10. In other words, the ratio Li/Me does not change before or after the firing process, so mixing must be performed so that the ratio Li/Me in this lithium mixture becomes the ratio Li/Me of the target positive-electrode active material.

The lithium compound that is used for forming the lithium mixture is not particularly limited, and for example, it is possible to use lithium hydroxide, lithium nitrate, lithium peroxide, lithium carbonate and the like, or a combination of these.

The lithium mixture is preferably mixed sufficiently before firing. When the mixture is not sufficient, variation will occur in the Li/Me ratio between individual particles, and there is a possibility that a problem of not being able to obtain sufficient battery characteristics will occur.

Moreover, a typical mixer can be used for mixing; for example, a shaker mixer, V blender, ribbon mixer, Julia mixer, Loedige mixer and the like can be used, and the nickel-containing composite hydroxide and the lithium compound should be sufficiently mixed to the extent that the shape of the particles of the nickel-containing composite hydroxide is not destroyed.

As described above, Al or Mn, or Al or Mn and added elements M, together with the lithium compound, can be mixed in this stage with a nickel-containing composite hydroxide that does not include any of these elements. Alternatively, the surface of a nickel-containing composite hydroxide that does not include any of these elements, or a nickel composite oxide that is heat treated particles of this nickel composite hydroxide can be coated with a compound of Al or Mn, or a compound of Al or Mn and added elements M, and after that mixed with the lithium compound. Furthermore, addition of these elements in the crystallization process and mixing and/or coating of these elements can be used in combination. In any case, Al or Mn and the added elements must be appropriately adjusted so that the composition is as in the general formula described above.

b) Firing Process

The firing process is a process for forming the positive-electrode active material by firing the lithium mixture that is obtained in the mixing process described above.

[Firing Temperature]

The firing temperature is preferably 650° C. to 850° C., and more preferably 700° C. to 800° C., and even more preferably 725° C. to 775° C. When the firing temperature is less than 650° C., Li is not sufficiently diffused into the nickel-containing composite hydroxide, and excess Li and unreacted particles remain, the crystal structure is not sufficiently aligned, and when used in a secondary battery, sufficient battery characteristics may not be obtained. However, when the firing temperature is greater than 850° C., vigorous sintering occurs between the secondary particles of the nickel-containing composite hydroxide and there is a possibility that abnormal particle growth will occur, and due to this, the particles after firing may become coarse, and it may not be possible to maintain the particle form (form of spherical secondary particles). The specific surface area of this kind of positive-electrode active material decreases, and when used in a secondary battery, there is a possibility that the resistance of the positive electrode will increase and the battery capacity will decrease. Moreover, there is a possibility that cation mixing will occur between the lithium and metal elements, the crystal structure will become disturbed, and a decrease in the battery capacity will occur.

[Firing Time]

Of the firing time, the maintenance time at the firing temperature is preferably 1 hour or more, and more preferably 3 hours to 10 hours. When the time is less than 1 hour, the lithium nickel-containing composite oxide may not be sufficiently generated.

[Firing Atmosphere]

The atmosphere during firing is preferably an atmosphere in which the oxygen concentration is 70% by volume to 100% by volume, and more preferably an atmosphere in which the oxygen concentration is 100% by volume. Particularly, when considering the battery characteristics, firing is performed in a flow of oxygen. The furnace used for firing is not particularly limited, however the lithium mixture should be able to be heated in air or in a flow of oxygen, and from the aspect of maintaining a uniform atmosphere inside the furnace, an electric furnace in which gas is not generated is used, and it is also possible to use a batch type or continuous type furnace.

[Crushing]

The lithium nickel-containing composite oxide that is obtained by firing may be such that aggregation or a small amount of sintering occurs. In this case, preferably the lithium nickel-containing composite oxide is crushed. In doing so, it is possible to obtain the lithium nickel-containing composite oxide, or in other words, the positive-electrode active material of the present invention. Crushing is an operation in which mechanical energy is applied to aggregates of plural secondary particles that occurred due to sintering necking between secondary particles during firing, and secondary particles are separated without hardly destroying the secondary particles.

c) Roasting Process

In the production method of the present invention, it is possible to arbitrarily provide a roasting process before mixing the nickel-containing composite hydroxide with the lithium compound, and then perform mixing with the lithium compound after the nickel-containing composite hydroxide is made into heat treated particles. Here, not only nickel-containing composite hydroxide from which excess moisture has been removed in the roasting process, but also nickel-containing composite oxide that is converted to an oxide in the roasting process, or a mixture of these is included in the heat treated particles.

In the roasting process, by heating and roasting nickel-containing composite hydroxide at a temperature of 400° C. to 900° C., moisture that is included in the nickel-containing composite hydroxide is removed. As a result, it is possible to reduce the moisture remaining in the particles up to the firing process to a fixed amount, so it is possible to prevent variations from occurring in the number of atoms of each of the metal components in the obtained positive-electrode active material and the ratio with the number of Li atoms, an thus it is possible to stabilize the atomic ratio of Li (Li/Me).

In the roasting process, moisture only needs to be removed to the extent that variation does not occur in the number of atoms of each metal component in the positive-electrode active material or in the ratio of the number of Li atoms, so it is not absolutely necessary to convert all of the nickel-containing composite hydroxide to nickel-containing composite oxide. However, in order to further reduce variation in the number of atoms of each of the metal components and in the ratio of the number of Li atoms, preferably the nickel-containing composite hydroxide is heated to the breakdown condition or greater, so that all of the nickel-containing composite hydroxide is converted to nickel-containing composite oxide.

The heating temperature in the roasting process is 400° C. to 900° C., and preferably 500° C. to 800° C. When the heating temperature is less than 400° C., it may not be possible to remove the excess moisture in the nickel-containing composite hydroxide, and to sufficiently suppress variation. However, when the heating temperature is greater than 900° C., further effect cannot be expected, and the production cost increases, so is not preferable. By performing analysis and finding beforehand each of the metal components that are included in the heat treated particles according to the roasting conditions, and determining the ratio with the lithium compound, it is possible to suppress the variation described above.

The atmosphere in which roasting is performed is not particularly limited, however the atmosphere should be a non-reducing atmosphere, and preferably roasting is performed in a simple air atmosphere.

Moreover, the roasting time is not particularly limited, however, when the time is less than one hour, the excess moisture in the nickel-containing composite hydroxide may be sufficiently removed, so preferably the time is one hour or more, and preferably 2 hours to 10 hours.

The equipment that is used in this kind of roasting is not particularly limited and as long as the nickel-containing composite hydroxide can be heated in a non-reducing atmosphere, and preferably in a flow of air, an electric furnace that does not generate gas can be suitably used.

(3) Nonaqueous-electrolyte Secondary Battery

The nonaqueous-electrolyte secondary battery of the present invention is such that the positive-electrode active material for a nonaqueous-electrolyte secondary battery described above is used as positive-electrode material. In the following, construction of a nonaqueous-electrolyte secondary battery of the present invention will be explained, however, the nonaqueous-electrolyte secondary battery of the present invention, except for using the positive-electrode active material for a nonaqueous-electrolyte secondary battery of the present invention as positive-electrode material, has essentially the same construction as a typical nonaqueous-electrolyte secondary battery.

For example, the secondary battery of the present invention has construction that includes a case, and a positive electrode, negative electrode, a nonaqueous electrolyte and a separator that are housed inside the case. More specifically, the secondary battery of the present invention is formed by layering the positive electrode and negative electrode via the separator to form an electrode body, impregnating the obtained electrode body with a nonaqueous electrolyte, using current-collector leads to connect between a positive-electrode current collector of the positive electrode and a positive-electrode terminal that leads to the outside, and a negative-electrode current collector of the negative electrode and a negative-electrode terminal that leads to the outside, and then sealing the case.

Needless to say, the construction of the secondary battery of the present invention is not limited, and it is possible to use various shapes, such as a tubular shape, a laminated shape and the like.

a) Components

[Positive Electrode]

First, the positive electrode (positive-electrode plate) that is a feature of the secondary battery of the present invention will be explained. The positive electrode is a sheet-shaped member and is formed by applying and drying a positive-electrode composite paste that includes the positive-electrode active material of the present invention on the surface of an aluminum foil current collector, for example.

The positive electrode is appropriately processed according to the battery that will be used. For example, a cutting process is performed to form the positive electrode into a suitable size for the target battery, and a compression process is performed using a roll press to increase the electrode density.

The positive-electrode composite paste is formed by adding a solvent to the positive-electrode mixture and kneading. The positive-electrode mixture is formed by mixing the positive-electrode active material of the present invention in a powder form with a conductive material and a binding agent.

The conductive material is added in order to provide suitable conductivity to the electrode. This conductive material is not particularly limited, however, graphite (natural graphite, artificial graphite, expanded graphite and the like), or a carbon black type material such as acetylene black, kitchen black or the like can be used, for example.

The binding agent serves the role of binding the particles of positive-electrode active material. The binding agent that is used in this positive-electrode mixture is not particularly limited, however, polyvinylidene fluoride (PVDF), polytetrafluoroethylene (PTFE), fluororubber, ethylene propylene diene rubber, styrene butadiene, cellulose resin, polyacrylic acid and the like can be used, for example.

Activated carbon and the like can be added to the positive-electrode mixture, and by adding activated carbon, it is possible to increase the electric double layer capacity of the positive electrode.

The solvent is for dispersing positive-electrode active material, conduction material, activated carbon and the like into binding agent. This solvent is not particularly limited, and for example, an organic solvent such as N-methyl-2-pyrrolidone can be used.

Moreover, the mixing ratios of all of the substances in the positive-electrode composite paste are not particularly limited. For example, when the solid portion of the positive-electrode mixture excluding the solvent is taken to be 100 parts by mass, as in a positive electrode of a typical nonaqueous-electrolyte secondary battery, the content of the positive-electrode active material can be 60 to 95 parts by mass, the content of the conductive material can be 1 to 20 parts by mass, and the content of the binding agent can be 1 to 20 parts by mass.

[Negative Electrode]

The negative electrode (negative-electrode plate) is a sheet-shaped member that is formed by applying and drying a negative-electrode composite paste on the surface of a metal foil current collector such as a copper foil current collector. Although the components and mixing of the components of the negative-electrode composite paste, and the material of the current collector and the like are different, this negative electrode is essentially formed by the same method as the positive electrode, and as in the case of the positive electrode, various processes are performed as necessary.

The negative-electrode composite paste is formed into a paste by adding a suitable solvent to a negative-electrode mixture that is a mixture of a negative-electrode active material and a binding agent.

As the negative-electrode active material, it is possible to use a lithium-containing substance such as metallic lithium, lithium alloy or the like, or an occluding substance that is capable of intercalation and deintercalation of lithium ions.

The occluding substance is not particularly limited, and it is possible, for example, to use a calcined body of an organic compound such as natural graphite, artificial graphite, phenol resin and the like, and a powdery carbon substance such as coke or the like. When this kind of occluding substance is used for the negative-electrode active material, as in the case of the positive electrode, a fluorine-containing resin such as PVDF or the like can be used as the binding agent, and an organic solvent such as N-methyl-2-pyrrolidone can be used as a solvent that disperses the negative-electrode active material into the binding agent.

[Separator]

The separator is arranged between the positive electrode and the negative electrode, and has the function of separating the positive electrode and negative electrode and holding the electrolyte. For this kind of separator, it is possible, for example, to use a thin film such as a polyethylene or polypropylene film having many fine pores, however, the separator is not limited as long as the separator has the functions described above.

[Nonaqueous Electrolyte]

The nonaqueous electrolyte is obtained by dissolving a lithium salt as a supporting salt in an organic solvent.

As the organic solvent, it is possible to use one kind alone, or to mix two or more kinds selected from a cyclic carbonate such as ethylene carbonate, propylene carbonate, butylene carbonate, trifluoropropylene carbonate; also a chain carbonate such as diethyl carbonate, dimethyl carbonate, ethyl methyl carbonate, dipropyl carbonate, and furthermore an ether compound such as tetrahydrofuran, 2-methyltetrahydrofuran, dimethoxyethane; a sulfur compound such as ethyl methyl sulfone, butanesulton; and a phosphorous compound such as triethyl phosphate, trioctyl phosphate, and the like.

As the supporting salt, $LiPF_6$, $LiBF_4$, $LiClO_4$, $LiAsF_6$, $LiN(CF_3SO_2)_2$ and composite salts of these and the like can be used.

In order to improve the battery characteristics, the nonaqueous electrolyte may also include a radical scavenger, a surfactant, a flame retardant and the like.

b) Characteristics of a Nonaqueous-electrolyte Secondary Battery of the Present Invention The nonaqueous-electrolyte secondary battery of the present invention has a positive electrode that uses the positive-electrode active material of the present invention that is made as described above, so for example, in the case of a 2032 type coin battery as constructed in the examples that will be described below, a high initial discharge capacity of 193.5 mAh/g or greater, a low irreversible capacity of 26.0 mAh/g or less, and a high Coulomb efficiency of 88.5% were simultaneously achieved.

c) Usage of the Secondary Battery of the Present Invention

The secondary battery of the present invention is suitable as the power source of portable electronic devices that always require a high capacity. Moreover, the secondary battery of the present invention is suitable as a battery for the power source of a motor drive that requires high output. As a secondary battery becomes large, it becomes difficult to maintain safety, and expensive protective circuits are indispensible, however, the secondary battery of the present invention has excellent safety, so not only does maintaining safety become easy, but it is also possible to simplify the expensive protective circuits and further lower the cost. In addition, a compact and high output secondary battery is possible, so the secondary battery of the present invention is suitable as the power source for transport equipment that has limited mounting space.

EXAMPLES

The present invention will be explained in further detail below by using examples, however, the present invention is not limited in any way by these examples. In the examples below, unless otherwise specified, reagent special grade samples manufactured by Wako Pure Chemical Industries, Ltd. were used in the production of the nickel-containing composite hydroxide, positive-electrode active material and the secondary battery.

Example 1

[Crystallization Process]

First, 32 L of industrial water, and 1300 mL of 25% by mass ammonia water were put into a overflow type crystallization reaction tank having a volume of 34 L (diameter: 300 mm, height: 500 mm) and four baffle plates installed, after which the temperature inside the tank was adjusted while stirring to 40° C. by using a thermostatic chamber and heating jacket. A 24% by mass caustic soda solution was then further added to the water in the reaction tank, and the pH value of the reaction solution inside the tank was adjusted to 10.9 to 11.1. This pH value is the pH value at a solution temperature of 40° C., so from the aspect of precise pH management, a small amount of the reaction solution was collected, and the pH value of the reaction solution was adjusted so that the pH value of the collected reaction solution when cooled to 25° C. was 11.7 to 11.9.

Next, nickel sulfate and cobalt sulfate were dissolved in water and the mixed aqueous solution was adjusted so as to contain 1.69 mol/L of nickel, and 0.31 mol/L of cobalt.

The crystallization process was performed by supplying the mixed aqueous solution at a rate of 30 mL/min while stirring the reaction solution with the solution temperature maintained at 40° C. When doing this, together with supplying 25% by mass ammonia water at a rate of 2.5 mL/min, by continuously supplying 24% by mass caustic soda solution, the pH value inside the reaction tank at a reference liquid temperature of 25° C. was controlled to be within the range 11.7 to 11.9, and the ammonia concentration was controlled to be 5 g/L.

The supply of the mixed aqueous solution was performed by inserting an injection nozzle into the reaction solution and directly injecting the mixed aqueous solution into the reaction solution. An injection nozzle, the tip end of which was branched into three, was used as the injection nozzle so that the mixed aqueous solution was not injected in the same location of the reaction solution. When doing this, the amount of mixed aqueous solution that was injected from each of these injection holes was about 10 mL/min. Moreover, stirring during the crystallization process was performed using a three-bladed propeller (inclination angle: 30°) having a diameter of 10 cm, and the stirring speed was 800 rpm.

After that, by causing the reaction tank to overflow, nickel-containing composite hydroxide was continuously removed for 48 hours to 72 hours after the start of the reaction. A powdery nickel-containing composite hydroxide was obtained by washing and drying this nickel-containing composite hydroxide. This nickel-containing composite hydroxide was moved to a separate reaction tank, and mixed with industrial water at normal temperature (25° C.) to make a slurry. While stirring this slurry, sodium aluminate was added so that the molar ratio of metal elements in the slurry became Ni:Co:Al=0.84:0.12:0.04, and sulfuric acid was added so that the pH value of the slurry became 9.5 at a reference liquid temperature of 25° C., after which stirring was performed for one more hour. After stirring was stopped, the obtained slurry was filtered to obtain a nickel-containing composite hydroxide that was covered with aluminum hydroxide.

The composition of this nickel-containing composite hydroxide was analyzed using an ICP emission spectrophotometer (ICPS-8100, manufactured by Shimadzu Corporation) and found to be expressed by the general formula: $Ni_{0.84}Co_{0.12}Al_{0.04}(OH)_{2+\alpha}$ (where $0 \leq \alpha \leq 0.50$). Moreover, the average particle size of the secondary particles of this nickel-containing composite hydroxide was measured using a laser diffraction type particle size distribution meter (Microtrac, manufactured by Nikkiso Co., Ltd.) and confirmed to be 29.4 μm, and the outer shape of the secondary particles was measured using a scanning electron microscope (S-4700, manufactured by Hitachi High-Technologies Corporation) and confirmed to be spherical or ellipsoidal shaped (hereafter, referred to as "roughly spherical") (refer to FIG. 1).

Furthermore, the secondary particles were embedded in epoxy resin and put into a state in which cross-section observation was possible by performing a cross-section polishing process, and as a result of observation using a scanning electron microscope, the average particle size of primary particles was confirmed to be 0.1 μm, and the outer shape was confirmed to be roughly spherical.

[Roasting Process]

The obtained nickel-containing composite hydroxide was roasted in air for 2 hours at 800° C. to obtain heat treated particles. The BET value of the heat treated particles was measured using a flow-type gas adsorption specific surface area measurement device (Multisorb, manufactured by Yuasa Ionics Inc.) and found to be 15.5 m$^2$/g.

[Mixing Process]

Next, a shaker mixer (TURBULA Type T2C, manufactured by Willy A. Bachofen AG (WAB)) was used to mix lithium hydroxide and the heat treated particles that were weighed so that Li/Me=1.02, and a lithium mixture was obtained.

[Firing Process]

The obtained lithium mixture underwent firing for 8 hours at 750° C. in a flow of oxygen (oxygen: 100% by volume) using a firing kiln (Roller Hearth Kiln, manufactured by NGK insulators, Inc.), then after being cooled to room temperature, was crushed to obtain positive-electrode active material.

The composition of this positive-electrode active material was analyzed using an ICP emission spectrophotometer and found to be expressed by the general formula: $Li_{1.02}Ni_{0.84}Co_{0.12}Al_{0.04}O_2$. Moreover, the crystal structure of this positive-electrode active material was checked using an X-ray diffraction apparatus (X'Pert PRO, manufactured by Panalitical) and found to be layered hexagonal crystal structure. Furthermore, from the results of Rietveld analysis of X-ray diffraction the non-lithium occupancy rate at site 3a was confirmed to be 1.1%.

Next, as in the case of the nickel-containing composite hydroxide, the average particle size and the outer shape of the secondary particles and primary particles of the lithium nickel-containing composite hydroxide of the positive-electrode active material was checked. As a result, it was found that the average particle size of the secondary particles was 29.8 μm and the outer shape was roughly spherical. Finally, the tap density was measured using a shaking type specific gravity measurement device (KRS-409, manufactured by Kuramochi Scientific Instruments Manufacturing Co., Ltd.) and as a result was found to be 2.7 g/cm$^3$. These results are listed in Table 1.

[Production of a Secondary Battery]

Figure 3:
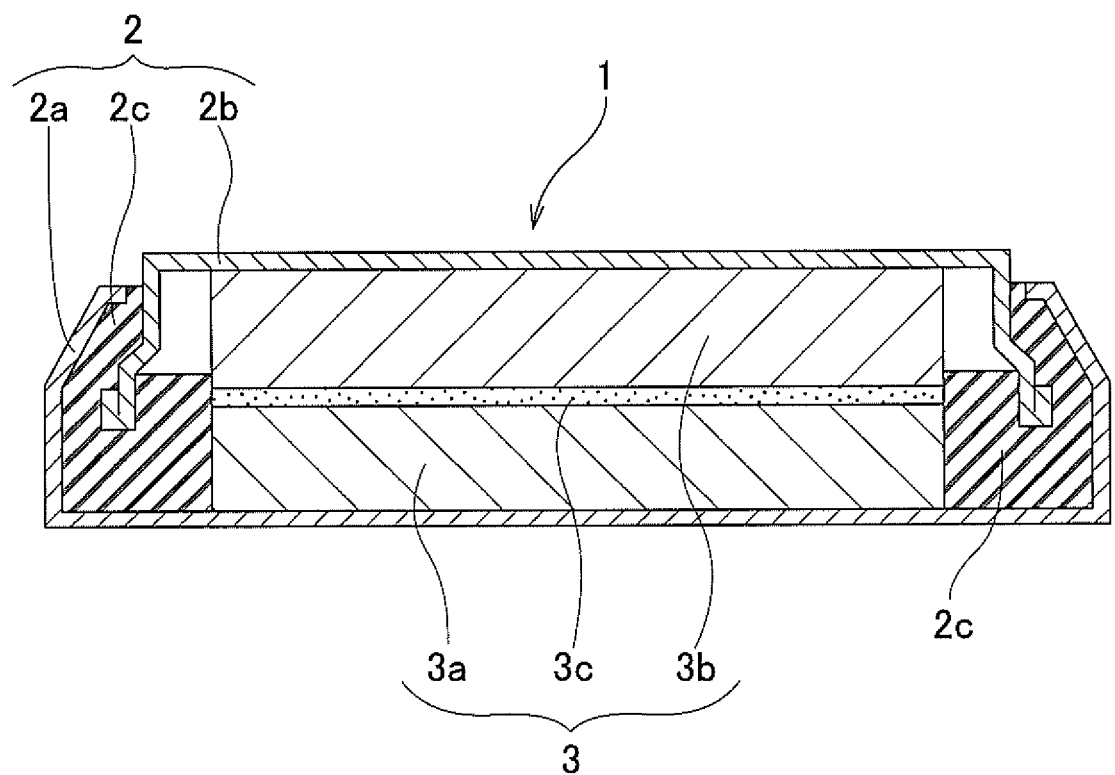
FIG. 3 is a cross-sectional view of a coin type battery that was used for battery evaluation.
Figure 4:
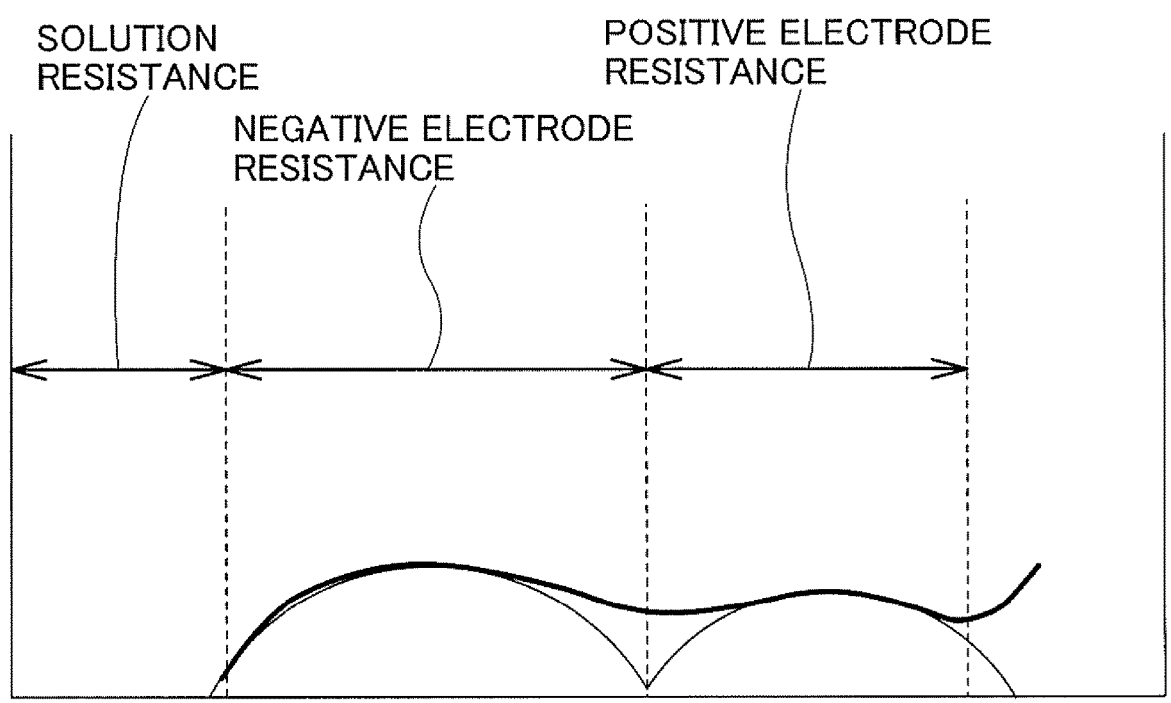
FIG. 4 is a figure for explaining an equivalent circuit that was used in measurement examples and analysis of impedance evaluation.
Figure 4:
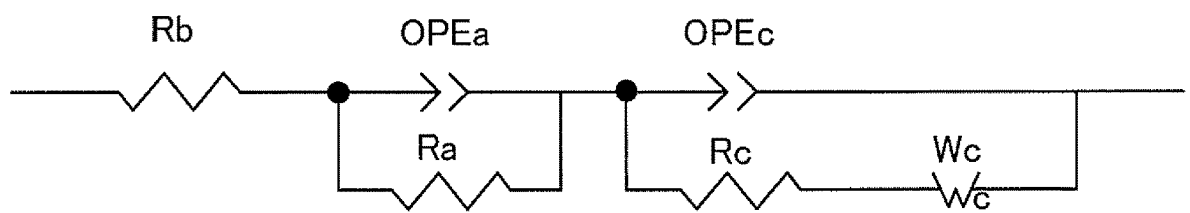

A 2032-type coin battery was used for evaluating the obtained positive-electrode active material. As illustrated in FIG. 3, this coin battery 1 includes a case 2 and an electrode 3 that is housed in the case 2.

The case 2 has a positive-electrode can 2a that is hollow and open on one end, and a negative-electrode can 2b that is placed in the opening section of the positive-electrode can 2a, and when the negative-electrode can 2b is placed in the opening section of the positive-electrode can 2a, a space for housing the electrode 3 is formed between the negative-electrode can 2b and the positive-electrode can 2a.

The electrode 3 includes a positive electrode 3a, a separator 3c and a negative electrode 3b that are layered so as to be arranged in this order, and is housed inside the case 2 so that the positive electrode 3a comes in contact with the inner surface of the positive-electrode can 2a, and the negative electrode 3b comes in contact with the inner surface of the negative-electrode can 2b.

The case 2 includes a gasket 2c, and this gasket 2c is fixed so that an electrically insulated state is maintained between the positive-electrode can 2a and the negative-electrode can 2b. Moreover, the gasket 2c seals the space between the positive-electrode can 2a and the negative-electrode can 2b, and has the function of forming an airtight seal and liquid tight seal between the inside of the case 2 and the outside.

This coin-type battery is manufactured as described below. First, the positive electrode 3a was made by mixing 52.5 mg of the obtained positive-electrode active material, 15 mg of acetylene black, and 7.5 mg of polytetrafluoroethylene resin (PTFE), then press forming to a diameter of 11 mm and thickness of 100 μm at a pressure of 100 MPa. This positive electrode 3a was then dried in a vacuum dryer for 12 hours at 120° C. Using the positive electrode 3a, negative electrode 3b, separator 3c and electrolyte, the coin battery 1 was made inside a glove box in an Ar atmosphere controlled to a dew point of −80° C.

Graphite powder having an average particle size of about 20 μm and that was punched out into a disk shape having a diameter of 14 mm, and a negative-electrode sheet in which polyvinylidene fluoride is coated on a copper foil were used for the negative electrode 3b. A porous polyethylene film having a film thickness of 25 μm was used for the separator 3c. An equal mixture of ethylene carbonate (EC) and diethyl carbonate (DEC) with 1M of $LiClO_4$ as the supporting electrolyte (manufactured by Toyama Pharmaceutical Industry Co., Ltd.) was used as the electrolyte.

[Battery Evaluation]

The initial charge capacity and the initial discharge capacity of the obtained coin-type battery 1 was measured using a multi-channel voltage/current generator (R6741A, manufactured by Advantest Corporation). More specifically, the coin-type battery 1 was let to sit for 24 hours after being manufactured, then after the open circuit voltage (OCV) became stable, the charge capacity of the battery when charged to a cut-off voltage of 4.3 V with the current density with respect to the positive electrode taken to be 0.1 mA/cm$^2$ was taken to be the initial charge capacity, and the capacity after one hour pause when discharged to a cut-off voltage of 3.0 V was taken to be the initial discharge capacity.

Moreover, the difference between the initial charge capacity and the initial discharge capacity that were obtained in this way was taken to be the irreversible capacity, and the ratio of the initial discharge capacity with respect to the initial charge capacity was calculated as the Coulomb efficiency. As a result, in Example 1, the initial discharge capacity was 196.8 mAh/g, the irreversible capacity was 24.1 mAh/g, and the Coulomb efficiency was 89.1%. The results are listed in Table 2.

Example 2

In the crystallization process, except for making the stirring speed (rpm) 600 rpm, nickel-containing composite hydroxide and positive-electrode active material having the same composition were obtained in the same way as in Example 1. The crystallization conditions and the characteristics of the obtained nickel-containing composite hydroxide are provided in Table 1, and the firing conditions and characteristics of the positive-electrode active material are provided in Table 2. Moreover, using this positive-electrode active material, a nonaqueous-electrolyte secondary battery was made in the same way as in Example 1 and evaluated. The results are provided in Table 2. The items provided in Table 1 and Table 2 are also the same in Examples 3 to 16 and Comparative Examples 1 to 10 below.

Example 3

In the crystallization process, except for making the stirring speed (rpm) 1200 rpm, nickel-containing composite hydroxide and positive-electrode active material having the same composition, and a nonaqueous-electrolyte secondary battery were obtained in the same way as in Example 1.

Example 4

In the crystallization process, except for controlling the pH value that is measured at a reference liquid temperature of 25° C. to be within the range 11.0 to 11.2, nickel-containing composite hydroxide and positive-electrode active material having the same composition, and a nonaqueous-electrolyte secondary battery were obtained in the same way as in Example 1.

Example 5

In the crystallization process, except for controlling the pH value that is measured at a reference liquid temperature of 25° C. to be within the range 11.0 to 11.2, and using a propeller having three blades (inclination angle: 45°) and a diameter of 10 cm as the stirring blades, nickel-containing composite hydroxide and positive-electrode active material having the same composition, and an nonaqueous-electrolyte secondary battery were obtained in the same way as in Example 1.

Example 6

In the crystallization process, except for maintaining the temperature inside the tank at 20° C., and using a propeller having three blades (inclination angle: 20°) and a diameter of 10 cm as the stirring blades, nickel-containing composite hydroxide and positive-electrode active material having the same composition, and an nonaqueous-electrolyte secondary battery were obtained in the same way as in Example 1.

Example 7

In the crystallization process, except for using a propeller having three blades (inclination angle: 60°) and a diameter of 10 cm as the stirring blades, nickel-containing composite hydroxide and positive-electrode active material having the same composition, and an nonaqueous-electrolyte secondary battery were obtained in the same way as in Example 1.

Example 8

In the crystallization process, except for maintaining the temperature inside the tank at 20° C., nickel-containing composite hydroxide and positive-electrode active material having the same composition, and a nonaqueous-electrolyte secondary battery were obtained in the same way as in Example 1.

Example 9

In the crystallization process, except for making the ammonium ion concentration 15 g/L, nickel-containing composite hydroxide and positive-electrode active material having the same composition, and a nonaqueous-electrolyte secondary battery were obtained in the same way as in Example 1.

Example 10

In the firing process, except for making the firing temperature 650° C., nickel-containing composite hydroxide and positive-electrode active material having the same composition, and a nonaqueous-electrolyte secondary battery were obtained in the same way as in Example 1.

Example 11

In the firing process, except for making the firing temperature 850° C., nickel-containing composite hydroxide and positive-electrode active material having the same composition, and a nonaqueous-electrolyte secondary battery were obtained in the same way as in Example 1.

Example 12

In the crystallization process, except for using ammonium chloride as the complexing agent, nickel-containing composite hydroxide and positive-electrode active material having the same composition, and a nonaqueous-electrolyte secondary battery were obtained in the same way as in Example 1.

Example 13

The nickel-containing composite hydroxide that was obtained by a crystallization process that is the same as in Example 1 was moved to a separate reaction tank and mixed with industrial water at normal temperature (25° C.) to make a slurry. While stirring this slurry, sodium aluminate and magnesium sulfate were added so that the molar ratio of metal elements in the slurry became Ni:Co:Al:Mg=0.84:0.12:0.02:0.02, and sulfuric acid was added so that the pH value of the slurry became 9.5 at a reference liquid temperature of 25° C., after which stirring was performed for one more hour. After stirring was stopped, the obtained slurry was filtered to obtain a nickel-containing composite hydroxide that was covered with aluminum hydroxide and magnesium hydroxide. The composition of the nickel-containing composite hydroxide was analyzed using an ICP emission spectrophotometer and found to be expressed by the general formula: $Ni_{0.84}Co_{0.12}Al_{0.02}Mg_{0.02}(OH)_{2+\alpha}$ (where $0 \leq \alpha \leq 0.50$).

Next, using this nickel-containing composite hydroxide, positive-electrode active material and a nonaqueous-electrolyte secondary battery were obtained in the same way as in Example 1. The composition of the positive-electrode active material was analyzed using an ICP emission spectrophotometer and found to be expressed by the general formula: $Li_{1.02}Ni_{0.84}Co_{0.12}Al_{0.02}Mg_{0.02}O_2$.

Example 14

The nickel-containing composite hydroxide that was obtained by a crystallization process that is the same as in Example 1 was moved to a separate reaction tank and mixed with industrial water at normal temperature (25° C.) to make a slurry. While stirring this slurry, sodium aluminate and potassium niobate were added so that the molar ratio of metal elements in the slurry became Ni:Co:Al:Nb=0.84:0.12:0.02:0.02, and sulfuric acid was added so that the pH value of the slurry became 9.5 at a reference liquid temperature of 25° C., after which stirring was performed for one more hour. After stirring was stopped, the obtained slurry was filtered to obtain a nickel-containing composite hydroxide that was covered with aluminum hydroxide and niobium oxide. The composition of the nickel-containing composite hydroxide was analyzed using an ICP emission spectrophotometer and found to be expressed by the general formula: $Ni_{0.84}Co_{0.12}Al_{0.02}Nb_{0.02}(OH)_{2+\alpha}$ (where $0 \leq \alpha \leq 0.50$).

Next, using this nickel-containing composite hydroxide, positive-electrode active material and a nonaqueous-electrolyte secondary battery were obtained in the same way as in Example 1. The composition of the positive-electrode active material was analyzed using an ICP emission spectrophotometer and found to be expressed by the general formula: $Li_{1.02}Ni_{0.84}Co_{0.12}Al_{0.02}Nb_{0.02}O_2$.

Example 15

The nickel-containing composite hydroxide that was obtained by a crystallization process that is the same as in Example 1 was moved to a separate reaction tank and mixed with industrial water at normal temperature (25° C.) to make a slurry. While stirring this slurry, sodium aluminate and titanium nitrate were added so that the molar ratio of metal elements in the slurry became Ni:Co:Al:Ti=0.84:0.12:0.02:0.02, and sulfuric acid was added so that the pH value of the slurry became 9.5 at a reference liquid temperature of 25° C., after which stirring was performed for one more hour. After stirring was stopped, the obtained slurry was filtered to obtain a nickel-containing composite hydroxide that was covered with aluminum hydroxide and titanium oxide. The composition of the nickel-containing composite hydroxide was analyzed using an ICP emission spectrophotometer and found to be expressed by the general formula: $Ni_{0.84}Co_{0.12}Al_{0.02}Ti_{0.02}(OH)_{2+\alpha}$ (where $0 \leq \alpha \leq 0.50$).

Next, using this nickel-containing composite hydroxide, positive-electrode active material and a nonaqueous-electrolyte secondary battery were obtained in the same way as in Example 1. The composition of the positive-electrode active material was analyzed using an ICP emission spectrophotometer and found to be expressed by the general formula: $Li_{1.02}Ni_{0.84}Co_{0.12}Al_{0.02}Ti_{0.02}O_2$.

Example 16

In the crystallization process, except for using a mixed aqueous solution that includes 0.70 mol/L of nickel, 0.70 mol/L of cobalt and 0.70 mol/L of manganese, nickel-containing composite hydroxide was obtained in the same was as in Example 1. The composition of the nickel-containing composite hydroxide was analyzed using an ICP emission spectrophotometer and found to be expressed by the general formula: $Ni_{0.34}Co_{0.33}Mn_{0.33}(OH)_{2+\alpha}$ (where $0 \leq \alpha \leq 0.50$).

Next, except for mixing lithium carbonate and the nickel-containing composite hydroxide that were weighed so that Li/Me=1.05 to obtain a lithium mixture, and performing firing of the lithium mixture in a flow of air for 8 hours at 950° C., positive-electrode active material and a nonaqueous-electrolyte secondary battery were obtained in the same way as in Example 1. The composition of the positive-electrode active material was analyzed using an ICP emission spectrophotometer and found to be expressed by the general formula: $Li_{1.02}Ni_{0.34}Co_{0.33}Mn_{0.33}O_2$.

Comparative Example 1

In the crystallization process, except for maintaining the temperature inside the tank at 50° C., nickel-containing composite hydroxide and positive-electrode active material having the same composition, and a nonaqueous-electrolyte secondary battery were obtained in the same way as in Example 1.

Comparative Example 2

In the crystallization process, except for maintaining the temperature inside the tank at 10° C., nickel-containing composite hydroxide and positive-electrode active material having the same composition, and a nonaqueous-electrolyte secondary battery were obtained in the same way as in Example 1.

Comparative Example 3

In the crystallization process, except for making the ammonium ion concentration 20 g/L, nickel-containing composite hydroxide and positive-electrode active material having the same composition, and a nonaqueous-electrolyte secondary battery were obtained in the same way as in Example 1.

Comparative Example 4

In the crystallization process, except for making the ammonium ion concentration 3 g/L, nickel-containing composite hydroxide and positive-electrode active material having the same composition, and a nonaqueous-electrolyte secondary battery were obtained in the same way as in Example 1.

Comparative Example 5

In the crystallization process, except for using a propeller having three blades (inclination angle: 90°) and a diameter of 10 cm as the stirring blades, nickel-containing composite hydroxide and positive-electrode active material having the same composition, and a nonaqueous-electrolyte secondary battery were obtained in the same way as in Example 1.

Comparative Example 6

In the crystallization process, except for maintaining the temperature inside the tank at 15° C. and using a propeller having three blades (inclination angle: 15°) and a diameter of 10 cm as the stirring blades, nickel-containing composite hydroxide and positive-electrode active material having the same composition, and a nonaqueous-electrolyte secondary battery were obtained in the same way as in Example 1.

Comparative Example 7

In the crystallization process, except for maintaining the temperature inside the tank at 15° C. and controlling the pH value that is measured at a reference liquid temperature of 25° C. to be within the range 13.2 to 13.4, nickel-containing composite hydroxide and positive-electrode active material having the same composition, and a nonaqueous-electrolyte secondary battery were obtained in the same way as in Example 1.

Comparative Example 8

In the crystallization process, except for controlling the pH value that is measured at a reference liquid temperature of 25° C. to be within the range 10.5 to 10.7, nickel-containing composite hydroxide and positive-electrode active material having the same composition, and a nonaqueous-electrolyte secondary battery were obtained in the same way as in Example 1.

Comparative Example 9

In the calcination process, except for making the calcination temperature 900° C., nickel-containing composite hydroxide and positive-electrode active material having the same composition, and a nonaqueous-electrolyte secondary battery were obtained in the same way as in Example 1.

Comparative Example 10

In the calcination process, except for making the calcination temperature 600° C., nickel-containing composite hydroxide and positive-electrode active material having the same composition, and a nonaqueous-electrolyte secondary battery were obtained in the same way as in Example 1.

TABLE 1

| | Crystallization Process | | | | | | Nickel Containing Composite Hydroxide | | | | |
|---|---|---|---|---|---|---|---|---|---|---|---|
| | Rpm | Inclination Angle (degree) | Liquid Temp. (° C.) | pH Value | Complexing Agent | $NH^{4+}$ Concentration | Additive Element M | Average Particle Size (μm) Primary Particles | Average Particle Size (μm) Secondary Particles | Shape of Secondary Particles | BET Value ($m^2/g$) |
| Ex. 1 | 800 | 30 | 40 | 11.7-11.9 | $NH_3$ | 5 | — | 0.1 | 29.4 | Spherical | 15.5 |
| Ex. 2 | 600 | 30 | 40 | 11.7-11.9 | $NH_3$ | 5 | — | 0.1 | 46.0 | Spherical | 13.9 |
| Ex. 3 | 1200 | 30 | 40 | 11.7-11.9 | $NH_3$ | 5 | — | 0.1 | 21.8 | Spherical | 17.8 |
| Ex. 4 | 800 | 30 | 40 | 11.0-11.2 | $NH_3$ | 5 | — | 0.3 | 38.6 | Spherical | 13.4 |
| Ex. 5 | 800 | 45 | 40 | 11.0-11.2 | $NH_3$ | 5 | — | 0.1 | 24.3 | Spherical | 21.6 |
| Ex. 6 | 800 | 20 | 20 | 11.7-11.9 | $NH_3$ | 5 | — | 0.1 | 43.2 | Spherical | 12.9 |
| Ex. 7 | 800 | 60 | 40 | 11.7-11.9 | $NH_3$ | 5 | — | 0.1 | 21.3 | Spherical | 13.1 |
| Ex. 8 | 800 | 30 | 20 | 11.7-11.9 | $NH_3$ | 5 | — | 0.1 | 27.3 | Spherical | 22.5 |
| Ex. 9 | 800 | 30 | 40 | 11.7-11.9 | $NH_3$ | 15 | — | 0.3 | 37.6 | Spherical | 13.5 |
| Ex. 10 | 800 | 30 | 40 | 11.7-11.9 | $NH_3$ | 5 | — | 0.1 | 29.4 | Spherical | 15.5 |
| Ex. 11 | 800 | 30 | 40 | 11.7-11.9 | $NH_3$ | 5 | — | 0.1 | 29.4 | Spherical | 15.5 |
| Ex. 12 | 800 | 30 | 40 | 11.7-11.9 | $NH_4Cl$ | 5 | — | 0.1 | 30.3 | Spherical | 16.1 |
| Ex. 13 | 800 | 30 | 40 | 11.7-11.9 | $NH_3$ | 5 | Mg | 0.1 | 29.4 | Spherical | 17.3 |
| Ex. 14 | 800 | 30 | 40 | 11.7-11.9 | $NH_3$ | 5 | Nb | 0.1 | 31.2 | Spherical | 18.1 |
| Ex. 15 | 800 | 30 | 40 | 11.7-11.9 | $NH_3$ | 5 | Ti | 0.1 | 30.5 | Spherical | 16.9 |
| Ex. 16 | 800 | 30 | 40 | 11.7-11.9 | $NH_3$ | 5 | — | 0.1 | 25.6 | Spherical | 14.5 |
| CE. 1 | 800 | 30 | 50 | 11.7-11.9 | $NH_3$ | 5 | — | 0.5 | 35.0 | Spherical | 9.7 |
| CE. 2 | 800 | 30 | 10 | 11.7-11.9 | $NH_3$ | 5 | — | 0.1 | 19.4 | Spherical | 25.3 |
| CE. 3 | 800 | 30 | 40 | 11.7-11.9 | $NH_3$ | 20 | — | 0.5 | 33.4 | Spherical | 7.8 |
| CE. 4 | 800 | 30 | 40 | 11.7-11.9 | $NH_3$ | 3 | — | 0.05 | 18.9 | Spherical | 11.6 |
| CE. 5 | 800 | 90 | 40 | 11.7-11.9 | $NH_3$ | 5 | — | 0.1 | 12.9 | Spherical | 13.8 |
| CE. 6 | 800 | 15 | 15 | 11.7-11.9 | $NH_3$ | 5 | — | 0.3 | 32.8 | Indefinite | 10.5 |
| CE. 7 | 800 | 30 | 15 | 13.2-13.4 | $NH_3$ | 5 | — | 0.05 | 18.3 | Spherical | 52.6 |
| CE. 8 | 800 | 30 | 40 | 10.5-10.7 | $NH_3$ | 5 | — | 0.5 | 38.5 | Spherical | 8.4 |
| CE. 9 | 800 | 30 | 40 | 11.7-11.9 | $NH_3$ | 5 | — | 0.1 | 29.4 | Spherical | 15.5 |
| CE. 10 | 800 | 30 | 40 | 11.7-11.9 | $NH_3$ | 5 | — | 0.1 | 29.4 | Spherical | 15.5 |

Note;
Ex.: Example;
CE: Comparative Example;
Spherical: Roughly Spherical

TABLE 2

| | Positive-electrode Active Material | | | | | Secondary battery | | |
|---|---|---|---|---|---|---|---|---|
| | Firing Process Firing Temperature. (° C.) | Non-lithium Occupancy Rate (%) | Average Particle Size (μm) | | Tap Density (g/cm$^3$) | Initial Discharge Capacity (mAh/g) | Irreversible (mAh/g) | Coulomb Efficiency (%) |
| | | | Primary Particles | Secondary Particles | | | | |
| Ex. 1 | 750 | 1.1 | 0.28 | 29.8 | 2.7 | 196.8 | 24.1 | 89.1 |
| Ex. 2 | 750 | 1.4 | 0.31 | 45.1 | 3.0 | 195.2 | 23.9 | 89.1 |
| Ex. 3 | 750 | 1.0 | 0.24 | 22.0 | 2.6 | 197.0 | 24.3 | 89.0 |
| Ex. 4 | 750 | 1.1 | 0.38 | 37.3 | 2.7 | 197.1 | 24.1 | 89.1 |
| Ex. 5 | 750 | 1.2 | 0.11 | 24.1 | 2.6 | 195.6 | 24.3 | 88.9 |
| Ex. 6 | 750 | 1.2 | 0.23 | 40.3 | 2.9 | 194.7 | 24.2 | 88.9 |
| Ex. 7 | 750 | 1.1 | 0.20 | 22.5 | 2.6 | 195.1 | 25.1 | 88.6 |
| Ex. 8 | 750 | 1.2 | 0.12 | 27.6 | 2.6 | 195.7 | 25.1 | 88.6 |
| Ex. 9 | 750 | 1.1 | 0.37 | 36.9 | 3.0 | 194.3 | 23.9 | 89.0 |
| Ex. 10 | 650 | 1.2 | 0.12 | 28.7 | 2.7 | 193.5 | 22.5 | 89.6 |
| Ex. 11 | 850 | 1.1 | 0.39 | 31.3 | 2.8 | 193.8 | 22.8 | 89.5 |
| Ex. 12 | 750 | 1.3 | 0.25 | 31.2 | 2.9 | 195.6 | 24.2 | 89.0 |
| Ex. 13 | 750 | 1.3 | 0.19 | 29.6 | 2.7 | 195.6 | 23.6 | 89.2 |
| Ex. 14 | 750 | 1.2 | 0.18 | 30.9 | 2.7 | 196.1 | 23.4 | 89.3 |
| Ex. 15 | 750 | 1.3 | 0.21 | 31.2 | 2.8 | 195.8 | 25.0 | 88.7 |
| Ex. 16 | 950 | 1.2 | 0.31 | 25.3 | 2.5 | 193.5 | 22.5 | 89.6 |
| CE. 1 | 750 | 2.0 | 0.52 | 35.0 | 2.6 | 191.7 | 22.5 | 88.9 |
| CE. 2 | 750 | 2.0 | 0.27 | 19.4 | 2.4 | 193.1 | 24.1 | 88.9 |
| CE. 3 | 750 | 2.6 | 0.53 | 33.4 | 2.8 | 189.9 | 24.5 | 88.6 |
| CE. 4 | 750 | 2.3 | 0.28 | 18.9 | 2.4 | 190.9 | 24.9 | 88.5 |
| CE. 5 | 750 | 1.1 | 0.32 | 12.9 | 2.4 | 192.3 | 23.0 | 88.1 |
| CE. 6 | 750 | 1.2 | 0.51 | 32.8 | 2.4 | 190.6 | 24.1 | 88.8 |
| CE. 7 | 750 | 1.2 | 0.24 | 18.3 | 2.5 | 192.3 | 25.1 | 88.5 |
| CE. 8 | 750 | 1.1 | 0.47 | 38.5 | 2.5 | 191.6 | 25.3 | 88.3 |
| CE. 9 | 900 | 1.6 | 0.52 | 35.6 | 2.6 | 187.6 | 30.4 | 88.1 |
| CE. 10 | 600 | 1.5 | 0.11 | 27.4 | 2.5 | 188.4 | 26.3 | 87.8 |

Note;
Ex.: Example;
CE: Comparative Example (Evaluation)

From Tables 1 and 2, it can be confirmed that for Example 1 to 16 the average particle size of the positive-electrode active material is 20 μm or greater, the non-lithium occupancy rate at site $3a$ is 1.5% or less, and the tap density is 2.5 g/cm$^3$ or greater. Therefore, when a nonaqueous-electrolyte secondary battery is constructed using the positive-electrode active material of the present invention, it can be seen that high-energy density can be achieved while suppressing the irreversible capacity. More specifically, it can be seen that it is possible to simultaneously achieve an initial discharge capacity of 193.5 mAh/g or greater, an irreversible capacity of 26.0 mAh/g or less, and a Coulomb efficiency of 88.5% or greater.

EXPLANATION OF REFERENCE NUMBERS

1 Coin-type battery
2 Case
2a Positive-electrode can
2b Negative-electrode can
2c Gasket
3 Electrode
3a Positive electrode
3b Negative electrode
3c Separator

What is claimed is:

1. A positive-electrode active material for a nonaqueous-electrolyte secondary battery, the positive-electrode active material comprising a lithium nickel-containing composite oxide that is expressed by the general formula: $Li_{1+u}Ni_{1-x-y}Co_xAl_yM_tO_2$, where $0<x\leq0.20$, $0<y\leq0.15$, $0\leq t\leq0.10$, $0\leq u\leq0.50$, and M is at least one element selected from among Mg, Ca, Ba, Nb, Mo, V, Ti, Zr or Y, or $Li_{1+u}Ni_{1-x-z}Co_xMn_zM_tO_2$, where $0<x\leq0.50$, $0<z\leq0.50$, $x+z\leq0.70$, $0\leq t\leq0.10$, $0\leq u\leq0.50$, and M is at least one element selected from among Mg, Ca, Ba, Nb, Mo, V, Ti, Zr or Y, the lithium nickel-containing composite oxide consisting of secondary particles that are formed by an aggregation of a plurality of primary particles, the primary particles having a layered hexagonal crystal structure; and the average particle size of the secondary particles is 20 μm to 50 μm or less, the average particle size of the primary particles is 0.10 μm to 0.40 μm, and the site occupancy of metal ions other than lithium ions at site $3a$ that is obtained from Rietveld analysis of X-ray diffraction is 1.5% or less; wherein the positive-electrode active material is prepared by a method comprising a step where the lithium nickel-containing composite oxide undergoes a firing process in an oxygen atmosphere at a temperature of 650° C. to 850° C.

2. The positive-electrode active material for a nonaqueous-electrolyte secondary battery according to claim 1, wherein a shape of the secondary particles is spherical or ellipsoidal.

3. The positive-electrode active material for a nonaqueous-electrolyte secondary battery according to claim 1, wherein a tap density of the secondary particles is 2.5 g/cm$^3$ or greater.

4. A production method for a positive-electrode active material for a nonaqueous-electrolyte secondary battery, the positive-electrode active material comprising a lithium nickel-containing composite oxide that has a layered hexagonal crystal structure that is expressed by the general formula: $Li_{1+u}Ni_{1-x-y}Co_xAl_yM_tO_2$, where $0<x\leq0.20$, $0<y\leq0.15$, $0\leq t\leq0.10$, $0\leq u\leq0.50$, and M is at least one element selected from among Mg, Ca, Ba, Nb, Mo, V, Ti, Zr or Y, or $Li_{1+u}Ni_{1-x-z}Co_xMn_zM_tO_2$, where $0<x\leq0.50$, $0<z\leq0.50$, $x+z\leq0.70$, $0\leq t\leq0.10$, $0\leq u\leq0.50$, and M is at least one element selected from among Mg, Ca, Ba, Nb, Mo, V, Ti, Zr or Y, the lithium nickel-containing composite oxide consisting of secondary particles that are formed by aggregation of a plurality of primary particles, the primary particles having a layered hexagonal crystal structure; and the average particle size of the secondary particles is more than 20 μm and 50 μm or less, the average particle size of the primary particles is 0.10 μm to 0.40 μm, and the site occupancy of the metal ions other than lithium ions at site $3a$ that is obtained from Rietveld analysis of X-ray diffraction is 1.5% or less;

the method comprising;

a mixing process for forming a lithium mixture by mixing a nickel-containing composite hydroxide or heat treated particles of the nickel-containing composite hydroxide with a lithium compound; wherein the nickel-containing composite hydroxide is expressed by general formula: $Ni_{1-x-y}Co_xAl_yM_t(OH)_{2+\alpha}$, where $0<x\leq0.20$, $0<y\leq0.15$, $0\leq t\leq0.10$, $0\leq\alpha\leq0.50$, and M is at least one element selected from among Mg, Ca, Ba, Nb, Mo, V, Ti, Zr, or Y, or $Ni_{1-x-z}Co_xMn_zM_t(OH)_{2+\alpha}$, where $0<x\leq0.50$, $0<z\leq0.50$, $x+z\leq0.70$, $0\leq t\leq0.10$, $0\leq\alpha\leq0.50$, and M is at least one element selected from among Mg, Ca, Ba, Nb, Mo, V, Ti, Zr, or Y; and a firing process of performing firing of the lithium nickel-containing composite oxide that was formed in the mixing process in an oxygen atmosphere at a temperature of 650° C. to 850° C., whereby the positive-electrode active material of claim 1 is formed.

5. The production method for a positive-electrode active material for a nonaqueous-electrolyte secondary battery according to claim 4, further comprising a roasting process before the mixing process for obtaining the heat treated particles by roasting the nickel-containing composite hydroxide in an air atmosphere at 400° C. to 900° C.

6. A nonaqueous-electrolyte secondary battery that uses the positive-electrode active material for a nonaqueous-electrolyte secondary battery according to claim 1 as a positive-electrode material.

* * * * *